(12) United States Patent
Kim et al.

(10) Patent No.: US 10,999,602 B2
(45) Date of Patent: May 4, 2021

(54) SPHERE PROJECTED MOTION ESTIMATION/COMPENSATION AND MODE DECISION

(71) Applicant: Apple Inc., Cupertino, CA (US)

(72) Inventors: Jae Hoon Kim, San Jose, CA (US); Xiaosong Zhou, Campbell, CA (US); Dazhong Zhang, Milpitas, CA (US); Hang Yuan, San Jose, CA (US); Jiefu Zhai, San Jose, CA (US); Chris Y. Chung, Sunnyvale, CA (US); Hsi-Jung Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/390,202

(22) Filed: Dec. 23, 2016

(65) Prior Publication Data
US 2018/0184121 A1    Jun. 28, 2018

(51) Int. Cl.
*H04N 19/176* (2014.01)
*H04N 19/105* (2014.01)
(Continued)

(52) U.S. Cl.
CPC ......... *H04N 19/597* (2014.11); *H04N 19/105* (2014.11); *H04N 19/176* (2014.11); *H04N 19/547* (2014.11)

(58) Field of Classification Search
CPC .... H04N 19/61; H04N 19/597; H04N 19/176; H04N 19/82; H04N 5/23238;
(Continued)

(56) References Cited

U.S. PATENT DOCUMENTS 4,890,257 A    12/1989  Anthias et al.
5,185,667 A     2/1993  Zimmerman
(Continued)

FOREIGN PATENT DOCUMENTS

EP    2077525 A1     7/2009
JP   2008-193458 A   8/2008
(Continued)

OTHER PUBLICATIONS

Boyce et al.; "Common Test Conditions and Evaluation Procedures for 360 degree Video Coding"; Joint Video Exploration Team; ITU-T SG 16 WP 3 and ISO/IEC JTC 1/SC 29/WG 11; Doc. JVET-D1030; Oct. 2016; 6 pages.
(Continued)

*Primary Examiner* — David N Werner
*Assistant Examiner* — Samuel D Fereja
(74) *Attorney, Agent, or Firm* — BakerHostetler

(57) ABSTRACT

Techniques are disclosed for coding video data predictively based on predictions made from spherical-domain projections of input pictures to be coded and reference pictures that are prediction candidates. Spherical projection of an input picture and the candidate reference pictures may be generated. Thereafter, a search may be conducted for a match between the spherical-domain representation of a pixel block to be coded and a spherical-domain representation of the reference picture. On a match, an offset may be determined between the spherical-domain representation of the pixel block to a matching portion of the of the reference picture in the spherical-domain representation. The spherical-domain offset may be transformed to a motion vector in a source-domain representation of the input picture, and the pixel block may be coded predictively with reference to a source-domain representation of the matching portion of the reference picture.

32 Claims, 9 Drawing Sheets

(51) Int. Cl.
*H04N 19/597* (2014.01)
*H04N 19/547* (2014.01)

(58) Field of Classification Search
CPC .... H04N 19/105; H04N 19/167; H04N 19/46;
H04N 19/463; H04N 19/52; H04N
19/523; H04N 13/161; H04N 13/189;
H04N 13/204; H04N 13/218; H04N
13/257; H04N 13/275; H04N 19/117;
H04N 19/85; H04N 13/0048; H04N
13/167; H04N 19/154; H04N 19/51;
H04N 19/70; H04N 19/187; H04N 19/44;
H04N 19/59; H04N 19/86; H04N
2013/0081; H04N 13/0014; H04N
13/117; H04N 13/139; H04N 13/261;
H04N 19/136; H04N 19/146; H04N
19/17; H04N 19/182; H04N 19/186;
H04N 19/20; H04N 19/513; H04N
13/0018; H04N 13/122; H04N 19/12;
H04N 19/124; H04N 19/14; H04N
19/147; H04N 19/172; H04N 19/192;
H04N 19/196
See application file for complete search history.

(56) References Cited

U.S. PATENT DOCUMENTS

| | | |
|---|---|---|
| 5,262,777 A | 11/1993 | Low et al. |
| 5,313,306 A | 5/1994 | Kuban et al. |
| 5,359,363 A | 10/1994 | Kuban et al. |
| 5,448,687 A | 9/1995 | Hoogerhyde et al. |
| 5,537,155 A | 7/1996 | O'Connell et al. |
| 5,600,346 A | 2/1997 | Kamata et al. |
| 5,684,937 A | 11/1997 | Oxaal |
| 5,689,800 A | 11/1997 | Downs |
| 5,715,016 A | 2/1998 | Kobayashi et al. |
| 5,787,207 A | 7/1998 | Golin |
| 5,872,604 A | 2/1999 | Ogura |
| 5,903,270 A | 5/1999 | Gentry et al. |
| 5,936,630 A | 8/1999 | Oxaal |
| 6,011,897 A | 1/2000 | Koyama et al. |
| 6,031,540 A | 2/2000 | Golin et al. |
| 6,043,837 A | 3/2000 | Driscoll, Jr. et al. |
| 6,058,212 A | 5/2000 | Yokoyama |
| 6,122,317 A | 9/2000 | Hanami et al. |
| 6,144,890 A | 11/2000 | Rothkop |
| 6,204,854 B1 | 3/2001 | Signes et al. |
| 6,219,089 B1 | 4/2001 | Driscoll, Jr. et al. |
| 6,222,883 B1 | 4/2001 | Murdock et al. |
| 6,317,159 B1 | 11/2001 | Aoyama |
| 6,331,869 B1 | 12/2001 | Furlan et al. |
| 6,426,774 B1 | 7/2002 | Driscoll, Jr. et al. |
| 6,535,643 B1 | 3/2003 | Hong |
| 6,539,060 B1 | 3/2003 | Lee et al. |
| 6,559,853 B1 | 5/2003 | Hashimoto et al. |
| 6,577,335 B2 | 6/2003 | Kobayashi et al. |
| 6,751,347 B2 | 6/2004 | Pettigrew et al. |
| 6,762,789 B1 | 7/2004 | Sogabe et al. |
| 6,769,131 B1 | 7/2004 | Tanaka et al. |
| 6,795,113 B1 | 9/2004 | Jackson et al. |
| 6,907,310 B2 | 6/2005 | Gardner et al. |
| 6,973,130 B1 | 12/2005 | Wee et al. |
| 6,993,201 B1 | 1/2006 | Haskell et al. |
| 7,006,707 B2 | 2/2006 | Peterson |
| 7,015,954 B1 | 3/2006 | Foote et al. |
| 7,039,113 B2 | 5/2006 | Soundararajan |
| 7,050,085 B1 | 5/2006 | Park et al. |
| 7,095,905 B1 | 8/2006 | Peterson |
| 7,123,777 B2 | 10/2006 | Rondinelli et al. |
| 7,139,440 B2 | 11/2006 | Rondinelli et al. |
| 7,149,549 B1 | 12/2006 | Ortiz et al. |
| 7,259,760 B1 | 8/2007 | Hashimoto et al. |
| 7,327,787 B1 | 2/2008 | Chen et al. |
| 7,382,399 B1 | 6/2008 | McCall et al. |
| 7,385,995 B2 | 6/2008 | Stiscia et al. |
| 7,415,356 B1 | 8/2008 | Gowda et al. |
| 7,433,535 B2 | 10/2008 | Mukherjee et al. |
| 7,450,749 B2 | 11/2008 | Rouet et al. |
| 7,593,041 B2 | 9/2009 | Novak et al. |
| 7,620,261 B2 | 11/2009 | Chiang et al. |
| 7,660,245 B1 | 2/2010 | Luby |
| 7,742,073 B1 | 6/2010 | Cohen-Solal et al. |
| 7,755,667 B2 | 7/2010 | Rabbani et al. |
| 7,782,357 B2 | 8/2010 | Cutler |
| 8,027,473 B2 | 9/2011 | Stiscia et al. |
| 8,045,615 B2 | 10/2011 | Liang et al. |
| 8,217,956 B1 | 7/2012 | Jin |
| 8,255,552 B2 | 8/2012 | Witt et al. |
| 8,270,496 B2 | 9/2012 | Yin et al. |
| 8,295,360 B1 | 10/2012 | Lewis et al. |
| 8,339,394 B1 | 12/2012 | Lininger |
| 8,442,109 B2 | 5/2013 | Wang et al. |
| 8,442,311 B1 | 5/2013 | Hobbs et al. |
| 8,462,109 B2 | 6/2013 | Nasiri et al. |
| 8,462,853 B2 | 6/2013 | Jeon et al. |
| 8,482,595 B2 | 7/2013 | Kweon |
| 8,682,091 B2 | 3/2014 | Amit et al. |
| 8,693,537 B2 | 4/2014 | Wang et al. |
| 8,711,941 B2 | 4/2014 | Letunovskiy et al. |
| 9,013,536 B2 | 4/2015 | Zhu et al. |
| 9,071,484 B1 | 6/2015 | Traux |
| 9,094,681 B1 | 7/2015 | Wilkins et al. |
| 9,098,870 B2 | 8/2015 | Meadow et al. |
| 9,219,919 B2 | 12/2015 | Deshpande |
| 9,224,247 B2 | 12/2015 | Wada et al. |
| 9,258,520 B2 | 2/2016 | Lee |
| 9,277,122 B1 | 3/2016 | Imura et al. |
| 9,404,764 B2 | 8/2016 | Lynch |
| 9,430,873 B2 | 8/2016 | Nakamura et al. |
| 9,510,007 B2 | 11/2016 | Chan et al. |
| 9,516,225 B2 | 12/2016 | Banta et al. |
| 9,596,899 B2 | 3/2017 | Stahl et al. |
| 9,639,935 B1 | 5/2017 | Douady-Pleven et al. |
| 9,723,223 B1 | 8/2017 | Banta et al. |
| 9,743,060 B1 | 8/2017 | Matias et al. |
| 9,754,413 B1 | 9/2017 | Gray |
| 9,781,356 B1 | 10/2017 | Banta et al. |
| 9,823,835 B2 | 11/2017 | Wang et al. |
| 9,838,687 B1 | 12/2017 | Banta et al. |
| 9,866,815 B2 | 1/2018 | Vrcelj et al. |
| 9,936,204 B1 | 4/2018 | Sim et al. |
| 9,967,563 B2 | 5/2018 | Hsu et al. |
| 9,967,577 B2 | 5/2018 | Wu et al. |
| 9,992,502 B2 | 6/2018 | Abbas et al. |
| 9,996,945 B1 | 6/2018 | Holzer et al. |
| 10,102,611 B1 | 10/2018 | Murtha et al. |
| 10,204,658 B2 | 2/2019 | Krishnan |
| 10,212,456 B2 | 2/2019 | Guo et al. |
| 10,277,897 B1 | 4/2019 | Mukherjee et al. |
| 10,282,814 B2 | 5/2019 | Lin et al. |
| 10,306,186 B2 | 5/2019 | Chuang et al. |
| 10,321,109 B1 | 6/2019 | Tanumihardja et al. |
| 10,334,222 B2 | 6/2019 | Kokare et al. |
| 10,339,627 B2 | 7/2019 | Abbas et al. |
| 10,339,688 B2 | 7/2019 | Su et al. |
| 10,349,068 B1 | 7/2019 | Banta et al. |
| 10,375,371 B2 | 8/2019 | Xu et al. |
| 10,455,238 B2 | 10/2019 | Mody et al. |
| 10,523,913 B2 | 12/2019 | Kim et al. |
| 10,559,121 B1 | 2/2020 | Moudgil et al. |
| 10,573,060 B1 | 2/2020 | Ascolese et al. |
| 10,574,997 B2 | 2/2020 | Chung et al. |
| 10,642,041 B2 | 5/2020 | Han et al. |
| 10,652,284 B2 | 5/2020 | Liu et al. |
| 10,728,546 B2 | 7/2020 | Leontaris et al. |
| 2001/0006376 A1 | 7/2001 | Numa et al. |
| 2001/0028735 A1 | 10/2001 | Pettigrew et al. |
| 2001/0036303 A1 | 11/2001 | Maurincomme et al. |
| 2002/0080878 A1 | 6/2002 | Li |
| 2002/0093670 A1 | 7/2002 | Luo et al. |
| 2002/0126129 A1 | 9/2002 | Snyder et al. |
| 2002/0140702 A1 | 10/2002 | Koller et al. |

(56) References Cited

U.S. PATENT DOCUMENTS

| | | |
|---|---|---|
| 2002/0141498 A1 | 10/2002 | Martins |
| 2002/0190980 A1 | 12/2002 | Gerritsen et al. |
| 2002/0196330 A1 | 12/2002 | Park et al. |
| 2003/0098868 A1 | 5/2003 | Fujiwara et al. |
| 2003/0099294 A1 | 5/2003 | Wang et al. |
| 2003/0152146 A1 | 8/2003 | Lin et al. |
| 2004/0022322 A1 | 2/2004 | Dye |
| 2004/0028133 A1 | 2/2004 | Subramaniyan et al. |
| 2004/0028134 A1 | 2/2004 | Subramaniyan et al. |
| 2004/0032906 A1 | 2/2004 | Lillig et al. |
| 2004/0056900 A1 | 3/2004 | Blume |
| 2004/0189675 A1 | 9/2004 | Pretlove et al. |
| 2004/0201608 A1 | 10/2004 | Ma et al. |
| 2004/0218099 A1 | 11/2004 | Washington |
| 2004/0227766 A1 | 11/2004 | Chou et al. |
| 2004/0247173 A1 | 12/2004 | Nielsen et al. |
| 2005/0013498 A1 | 1/2005 | Srinivasan et al. |
| 2005/0041023 A1 | 2/2005 | Green |
| 2005/0069682 A1 | 3/2005 | Tseng |
| 2005/0129124 A1 | 6/2005 | Ha |
| 2005/0204113 A1 | 9/2005 | Harper et al. |
| 2005/0243915 A1 | 11/2005 | Kwon et al. |
| 2005/0244063 A1 | 11/2005 | Kwon et al. |
| 2005/0286777 A1 | 12/2005 | Kumar et al. |
| 2006/0034527 A1 | 2/2006 | Gritsevich |
| 2006/0055699 A1 | 3/2006 | Perlman et al. |
| 2006/0055706 A1 | 3/2006 | Perlman et al. |
| 2006/0110062 A1 | 5/2006 | Chiang et al. |
| 2006/0119599 A1 | 6/2006 | Woodbury |
| 2006/0126719 A1 | 6/2006 | Wilensky |
| 2006/0132482 A1 | 6/2006 | Oh |
| 2006/0165164 A1 | 7/2006 | Kwan et al. |
| 2006/0165181 A1 | 7/2006 | Kwan et al. |
| 2006/0204043 A1 | 9/2006 | Takei |
| 2006/0238445 A1 | 10/2006 | Wang et al. |
| 2006/0282855 A1 | 12/2006 | Margulis |
| 2007/0024705 A1 | 2/2007 | Richter et al. |
| 2007/0057943 A1 | 3/2007 | Beda et al. |
| 2007/0064120 A1 | 3/2007 | Didow et al. |
| 2007/0071100 A1 | 3/2007 | Shi et al. |
| 2007/0097268 A1 | 5/2007 | Relan et al. |
| 2007/0115841 A1 | 5/2007 | Taubman et al. |
| 2007/0223582 A1 | 9/2007 | Borer |
| 2007/0263722 A1 | 11/2007 | Fukuzawa |
| 2007/0291143 A1 | 12/2007 | Barbieri et al. |
| 2008/0036875 A1 | 2/2008 | Jones et al. |
| 2008/0044104 A1 | 2/2008 | Gering |
| 2008/0049991 A1 | 2/2008 | Gering |
| 2008/0077953 A1 | 3/2008 | Fernandez et al. |
| 2008/0118180 A1 | 5/2008 | Kamiya et al. |
| 2008/0184128 A1 | 7/2008 | Swenson et al. |
| 2008/0252717 A1 | 10/2008 | Moon et al. |
| 2008/0310513 A1 | 12/2008 | Ma et al. |
| 2009/0040224 A1 | 2/2009 | Igarashi et al. |
| 2009/0123088 A1 | 5/2009 | Kallay et al. |
| 2009/0153577 A1 | 6/2009 | Ghyme et al. |
| 2009/0190858 A1 | 7/2009 | Moody et al. |
| 2009/0219280 A1 | 9/2009 | Maillot |
| 2009/0219281 A1 | 9/2009 | Maillot |
| 2009/0251530 A1 | 10/2009 | Cilia et al. |
| 2009/0262838 A1 | 10/2009 | Gholmieh et al. |
| 2010/0029339 A1 | 2/2010 | Kim et al. |
| 2010/0061451 A1 | 3/2010 | Fuchigami |
| 2010/0079605 A1 | 4/2010 | Wang et al. |
| 2010/0080287 A1 | 4/2010 | Ali |
| 2010/0110481 A1 | 5/2010 | Do et al. |
| 2010/0124274 A1 | 5/2010 | Cheok et al. |
| 2010/0135389 A1 | 6/2010 | Tanizawa et al. |
| 2010/0215226 A1 | 8/2010 | Kaufman et al. |
| 2010/0305909 A1 | 12/2010 | Wolper et al. |
| 2010/0316129 A1 | 12/2010 | Zhao et al. |
| 2010/0329361 A1 | 12/2010 | Choi et al. |
| 2010/0329362 A1 | 12/2010 | Choi et al. |
| 2011/0058055 A1 | 3/2011 | Lindahl et al. |
| 2011/0090967 A1 | 4/2011 | Chen et al. |
| 2011/0128350 A1 | 6/2011 | Oliver et al. |
| 2011/0142306 A1 | 6/2011 | Nair |
| 2011/0194617 A1 | 8/2011 | Kumar et al. |
| 2011/0200100 A1 | 8/2011 | Kim et al. |
| 2011/0235706 A1 | 9/2011 | Demircin et al. |
| 2011/0274158 A1 | 11/2011 | Fu et al. |
| 2011/0305274 A1 | 12/2011 | Fu et al. |
| 2011/0310089 A1 | 12/2011 | Petersen |
| 2012/0082232 A1 | 4/2012 | Rojals et al. |
| 2012/0098926 A1 | 4/2012 | Kweon |
| 2012/0192115 A1 | 7/2012 | Falchuk et al. |
| 2012/0219055 A1 | 8/2012 | He et al. |
| 2012/0230392 A1 | 9/2012 | Zheng et al. |
| 2012/0260217 A1 | 10/2012 | Celebisoy |
| 2012/0263231 A1 | 10/2012 | Zhou |
| 2012/0307746 A1 | 12/2012 | Hammerschmidt et al. |
| 2012/0320169 A1 | 12/2012 | Bathiche |
| 2012/0320984 A1 | 12/2012 | Zhou |
| 2012/0327172 A1 | 12/2012 | El-Saban et al. |
| 2013/0003858 A1 | 1/2013 | Sze |
| 2013/0016783 A1 | 1/2013 | Kim et al. |
| 2013/0044108 A1 | 2/2013 | Tanaka et al. |
| 2013/0051452 A1 | 2/2013 | Li et al. |
| 2013/0051467 A1 | 2/2013 | Zhou et al. |
| 2013/0088491 A1 | 4/2013 | Hobbs et al. |
| 2013/0094568 A1 | 4/2013 | Hsu et al. |
| 2013/0101025 A1 | 4/2013 | Van der Auwera et al. |
| 2013/0101042 A1 | 4/2013 | Sugio et al. |
| 2013/0111399 A1 | 5/2013 | Rose |
| 2013/0124156 A1 | 5/2013 | Wolper et al. |
| 2013/0127844 A1 | 5/2013 | Koeppel et al. |
| 2013/0128986 A1 | 5/2013 | Tsai et al. |
| 2013/0136174 A1 | 5/2013 | Xu et al. |
| 2013/0170726 A1 | 7/2013 | Kaufman et al. |
| 2013/0182775 A1 | 7/2013 | Wang et al. |
| 2013/0195183 A1 | 8/2013 | Zhai et al. |
| 2013/0208787 A1 | 8/2013 | Zheng et al. |
| 2013/0219012 A1 | 8/2013 | Suresh et al. |
| 2013/0251028 A1 | 9/2013 | Au et al. |
| 2013/0272415 A1 | 10/2013 | Zhou |
| 2013/0301706 A1 | 11/2013 | Qiu et al. |
| 2014/0002439 A1 | 1/2014 | Lynch |
| 2014/0003450 A1 | 1/2014 | Bentley et al. |
| 2014/0010293 A1 | 1/2014 | Srinivasan et al. |
| 2014/0078263 A1 | 3/2014 | Kim |
| 2014/0082054 A1 | 3/2014 | Denoual et al. |
| 2014/0089326 A1 | 3/2014 | Lin et al. |
| 2014/0140401 A1 | 5/2014 | Lee et al. |
| 2014/0153636 A1 | 6/2014 | Esenlik et al. |
| 2014/0169469 A1 | 6/2014 | Bernal et al. |
| 2014/0176542 A1 | 6/2014 | Shohara et al. |
| 2014/0218356 A1 | 8/2014 | Distler et al. |
| 2014/0254949 A1 | 9/2014 | Chou |
| 2014/0267235 A1 | 9/2014 | DeJohn et al. |
| 2014/0269899 A1 | 9/2014 | Park et al. |
| 2014/0286410 A1 | 9/2014 | Zenkich |
| 2014/0355667 A1 | 12/2014 | Lei et al. |
| 2014/0368669 A1 | 12/2014 | Talvala et al. |
| 2014/0376634 A1 | 12/2014 | Guo et al. |
| 2015/0003525 A1 | 1/2015 | Sasai et al. |
| 2015/0003725 A1 | 1/2015 | Wan |
| 2015/0016522 A1 | 1/2015 | Sato |
| 2015/0029294 A1 | 1/2015 | Lin et al. |
| 2015/0062292 A1 | 3/2015 | Kweon |
| 2015/0089348 A1 | 3/2015 | Jose |
| 2015/0103884 A1 | 4/2015 | Ramasubramonian et al. |
| 2015/0145966 A1 | 5/2015 | Krieger et al. |
| 2015/0195491 A1 | 7/2015 | Shaburov et al. |
| 2015/0195559 A1 | 7/2015 | Chen et al. |
| 2015/0215631 A1 | 7/2015 | Zhou et al. |
| 2015/0237370 A1 | 8/2015 | Zhou et al. |
| 2015/0256839 A1 | 9/2015 | Ueki et al. |
| 2015/0264259 A1 | 9/2015 | Raghoebardajal et al. |
| 2015/0264386 A1 | 9/2015 | Pang et al. |
| 2015/0264404 A1 | 9/2015 | Hannuksela |
| 2015/0271517 A1 | 9/2015 | Pang et al. |
| 2015/0279087 A1 | 10/2015 | Myers et al. |
| 2015/0279121 A1 | 10/2015 | Myers et al. |
| 2015/0304665 A1 | 10/2015 | Hannuksela et al. |

(56) References Cited

U.S. PATENT DOCUMENTS

| | | |
|---|---|---|
| 2015/0321103 A1 | 11/2015 | Barnett et al. |
| 2015/0326865 A1 | 11/2015 | Yin et al. |
| 2015/0339853 A1 | 11/2015 | Wolper et al. |
| 2015/0341552 A1 | 11/2015 | Chen et al. |
| 2015/0346812 A1 | 12/2015 | Cole et al. |
| 2015/0346832 A1 | 12/2015 | Cole et al. |
| 2015/0350673 A1 | 12/2015 | Hu et al. |
| 2015/0351477 A1 | 12/2015 | Stahl et al. |
| 2015/0358612 A1 | 12/2015 | Sandrew et al. |
| 2015/0358613 A1 | 12/2015 | Sandrew et al. |
| 2015/0358633 A1 | 12/2015 | Choi et al. |
| 2015/0373334 A1 | 12/2015 | Rapaka et al. |
| 2015/0373372 A1 | 12/2015 | He et al. |
| 2016/0012855 A1 | 1/2016 | Krishnan |
| 2016/0014422 A1 | 1/2016 | Su et al. |
| 2016/0027187 A1 | 1/2016 | Wang et al. |
| 2016/0050369 A1 | 2/2016 | Takenaka et al. |
| 2016/0080753 A1 | 3/2016 | Oh |
| 2016/0112489 A1 | 4/2016 | Adams et al. |
| 2016/0112704 A1 | 4/2016 | Grange et al. |
| 2016/0142697 A1 | 5/2016 | Budagavi et al. |
| 2016/0150231 A1 | 5/2016 | Schulze |
| 2016/0165257 A1 | 6/2016 | Chen et al. |
| 2016/0227214 A1 | 8/2016 | Rapaka et al. |
| 2016/0234438 A1 | 8/2016 | Satoh |
| 2016/0241836 A1 | 8/2016 | Cole et al. |
| 2016/0269632 A1 | 9/2016 | Morioka |
| 2016/0277746 A1 | 9/2016 | Fu et al. |
| 2016/0286119 A1 | 9/2016 | Rondinelli |
| 2016/0350585 A1 | 12/2016 | Lin et al. |
| 2016/0350592 A1 | 12/2016 | Ma et al. |
| 2016/0352791 A1* | 12/2016 | Adams ............... H04L 65/4069 |
| 2016/0353089 A1 | 12/2016 | Gallup et al. |
| 2016/0353146 A1 | 12/2016 | Weaver et al. |
| 2016/0360104 A1 | 12/2016 | Zhang et al. |
| 2016/0360180 A1 | 12/2016 | Cole et al. |
| 2017/0013279 A1 | 1/2017 | Puri et al. |
| 2017/0026659 A1 | 1/2017 | Lin et al. |
| 2017/0038942 A1 | 2/2017 | Rosenfeld et al. |
| 2017/0054907 A1 | 2/2017 | Nishihara et al. |
| 2017/0064199 A1 | 3/2017 | Lee et al. |
| 2017/0078447 A1 | 3/2017 | Hancock et al. |
| 2017/0085892 A1 | 3/2017 | Liu et al. |
| 2017/0094184 A1 | 3/2017 | Gao et al. |
| 2017/0104927 A1 | 4/2017 | Mugavero et al. |
| 2017/0109930 A1 | 4/2017 | Holzer et al. |
| 2017/0127008 A1 | 5/2017 | Kankaanpaa et al. |
| 2017/0142371 A1 | 5/2017 | Barzuza et al. |
| 2017/0155912 A1 | 6/2017 | Thomas et al. |
| 2017/0180635 A1 | 6/2017 | Hayashi et al. |
| 2017/0200255 A1 | 7/2017 | Lin et al. |
| 2017/0200315 A1 | 7/2017 | Lockhart |
| 2017/0208346 A1 | 7/2017 | Narroschke et al. |
| 2017/0214937 A1 | 7/2017 | Lin et al. |
| 2017/0223268 A1 | 8/2017 | Shimmoto |
| 2017/0223368 A1 | 8/2017 | Abbas et al. |
| 2017/0228867 A1 | 8/2017 | Baruch |
| 2017/0230668 A1 | 8/2017 | Lin et al. |
| 2017/0236323 A1 | 8/2017 | Lim et al. |
| 2017/0244775 A1 | 8/2017 | Ha et al. |
| 2017/0251208 A1 | 8/2017 | Adsumilli et al. |
| 2017/0257644 A1 | 9/2017 | Andersson et al. |
| 2017/0272698 A1 | 9/2017 | Liu et al. |
| 2017/0272758 A1 | 9/2017 | Lin et al. |
| 2017/0278262 A1 | 9/2017 | Kawamoto et al. |
| 2017/0280126 A1* | 9/2017 | Van der Auwera ......................... H04N 13/0048 |
| 2017/0287200 A1 | 10/2017 | Forutanpour et al. |
| 2017/0287220 A1 | 10/2017 | Khalid et al. |
| 2017/0295356 A1 | 10/2017 | Abbas et al. |
| 2017/0301065 A1 | 10/2017 | Adsumilli et al. |
| 2017/0301132 A1 | 10/2017 | Dalton et al. |
| 2017/0302714 A1 | 10/2017 | Ramsay et al. |
| 2017/0302951 A1 | 10/2017 | Joshi et al. |
| 2017/0309143 A1 | 10/2017 | Trani et al. |
| 2017/0322635 A1 | 11/2017 | Yoon et al. |
| 2017/0323422 A1 | 11/2017 | Kim et al. |
| 2017/0323423 A1 | 11/2017 | Lin et al. |
| 2017/0332107 A1 | 11/2017 | Abbas et al. |
| 2017/0336705 A1 | 11/2017 | Zhou et al. |
| 2017/0339324 A1 | 11/2017 | Tocher et al. |
| 2017/0339341 A1 | 11/2017 | Zhou et al. |
| 2017/0339391 A1 | 11/2017 | Zhou et al. |
| 2017/0339392 A1 | 11/2017 | Forutanpour et al. |
| 2017/0339415 A1 | 11/2017 | Wang et al. |
| 2017/0344843 A1 | 11/2017 | Wang et al. |
| 2017/0353737 A1 | 12/2017 | Lin et al. |
| 2017/0359590 A1 | 12/2017 | Zhang et al. |
| 2017/0366808 A1 | 12/2017 | Lin et al. |
| 2017/0374332 A1 | 12/2017 | Yamaguchi et al. |
| 2017/0374375 A1 | 12/2017 | Makar et al. |
| 2018/0005447 A1 | 1/2018 | Wallner et al. |
| 2018/0005449 A1 | 1/2018 | Wallner et al. |
| 2018/0007387 A1 | 1/2018 | Izumi |
| 2018/0007389 A1 | 1/2018 | Izumi |
| 2018/0018807 A1 | 1/2018 | Lu et al. |
| 2018/0020202 A1 | 1/2018 | Xu et al. |
| 2018/0020238 A1 | 1/2018 | Liu et al. |
| 2018/0027178 A1 | 1/2018 | Macmillan et al. |
| 2018/0027226 A1 | 1/2018 | Abbas et al. |
| 2018/0027257 A1 | 1/2018 | Izumi et al. |
| 2018/0047208 A1 | 2/2018 | Marin et al. |
| 2018/0048890 A1 | 2/2018 | Kim et al. |
| 2018/0053280 A1 | 2/2018 | Kim et al. |
| 2018/0054613 A1 | 2/2018 | Lin et al. |
| 2018/0061002 A1 | 3/2018 | Lee et al. |
| 2018/0063505 A1 | 3/2018 | Lee et al. |
| 2018/0063544 A1 | 3/2018 | Tourapis et al. |
| 2018/0075576 A1 | 3/2018 | Liu et al. |
| 2018/0075604 A1 | 3/2018 | Kim et al. |
| 2018/0075635 A1 | 3/2018 | Choi et al. |
| 2018/0077451 A1 | 3/2018 | Yip et al. |
| 2018/0084257 A1 | 3/2018 | Abbas |
| 2018/0091812 A1 | 3/2018 | Guo et al. |
| 2018/0098090 A1 | 4/2018 | Lin et al. |
| 2018/0101931 A1 | 4/2018 | Abbas et al. |
| 2018/0109810 A1 | 4/2018 | Xu et al. |
| 2018/0124312 A1* | 5/2018 | Chang .................... H04N 19/46 |
| 2018/0130243 A1 | 5/2018 | Kim et al. |
| 2018/0130264 A1 | 5/2018 | Ebacher |
| 2018/0146136 A1 | 5/2018 | Yamamoto |
| 2018/0146138 A1 | 5/2018 | Jeon et al. |
| 2018/0152636 A1 | 5/2018 | Yim et al. |
| 2018/0152663 A1 | 5/2018 | Wozniak et al. |
| 2018/0160113 A1 | 6/2018 | Jeong et al. |
| 2018/0160138 A1 | 6/2018 | Park |
| 2018/0160156 A1 | 6/2018 | Hannuksela et al. |
| 2018/0164593 A1 | 6/2018 | Van der Auwera et al. |
| 2018/0167613 A1 | 6/2018 | Hannuksela et al. |
| 2018/0167634 A1 | 6/2018 | Salmimaa et al. |
| 2018/0174619 A1 | 6/2018 | Roy et al. |
| 2018/0176468 A1 | 6/2018 | Wang et al. |
| 2018/0176536 A1 | 6/2018 | Jo et al. |
| 2018/0176596 A1 | 6/2018 | Jeong et al. |
| 2018/0176603 A1 | 6/2018 | Fujimoto |
| 2018/0184101 A1 | 6/2018 | Ho |
| 2018/0184121 A1 | 6/2018 | Kim et al. |
| 2018/0191787 A1 | 7/2018 | Morita et al. |
| 2018/0192074 A1 | 7/2018 | Shih et al. |
| 2018/0199029 A1 | 7/2018 | Van der Auwera et al. |
| 2018/0199034 A1 | 7/2018 | Nam et al. |
| 2018/0199070 A1 | 7/2018 | Wang |
| 2018/0218512 A1 | 8/2018 | Chan et al. |
| 2018/0220138 A1 | 8/2018 | He et al. |
| 2018/0227484 A1 | 8/2018 | Hung et al. |
| 2018/0234700 A1 | 8/2018 | Kim et al. |
| 2018/0240223 A1 | 8/2018 | Yi et al. |
| 2018/0240276 A1 | 8/2018 | He et al. |
| 2018/0242016 A1 | 8/2018 | Lee et al. |
| 2018/0242017 A1 | 8/2018 | Van Leuven et al. |
| 2018/0249076 A1 | 8/2018 | Sheng et al. |
| 2018/0249163 A1 | 8/2018 | Curcio et al. |
| 2018/0249164 A1 | 8/2018 | Kim et al. |
| 2018/0253879 A1 | 9/2018 | Li et al. |

(56) References Cited

U.S. PATENT DOCUMENTS

| | | |
|---|---|---|
| 2018/0268517 A1 | 9/2018 | Coban et al. |
| 2018/0270417 A1 | 9/2018 | Suitoh et al. |
| 2018/0276789 A1 | 9/2018 | Van der Auwera et al. |
| 2018/0276826 A1 | 9/2018 | Van der Auwera et al. |
| 2018/0276890 A1 | 9/2018 | Wang |
| 2018/0288435 A1 | 10/2018 | Boyce et al. |
| 2018/0295282 A1 | 10/2018 | Boyce et al. |
| 2018/0302621 A1 | 10/2018 | Fu et al. |
| 2018/0307398 A1 | 10/2018 | Kim et al. |
| 2018/0315245 A1 | 11/2018 | Patel |
| 2018/0322611 A1 | 11/2018 | Bang et al. |
| 2018/0329482 A1 | 11/2018 | Woo et al. |
| 2018/0332265 A1 | 11/2018 | Hwang et al. |
| 2018/0332279 A1 | 11/2018 | Kang et al. |
| 2018/0338142 A1 | 11/2018 | Kim et al. |
| 2018/0343388 A1 | 11/2018 | Matsushita |
| 2018/0349705 A1 | 12/2018 | Kim et al. |
| 2018/0350407 A1 | 12/2018 | Decoodt et al. |
| 2018/0352225 A1 | 12/2018 | Guo et al. |
| 2018/0352259 A1 | 12/2018 | Guo et al. |
| 2018/0352264 A1 | 12/2018 | Guo et al. |
| 2018/0359487 A1 | 12/2018 | Bang et al. |
| 2018/0374192 A1* | 12/2018 | Kunkel ............... G06T 15/205 |
| 2018/0376126 A1 | 12/2018 | Hannuksela |
| 2018/0376152 A1 | 12/2018 | Wang et al. |
| 2019/0004414 A1 | 1/2019 | Kim et al. |
| 2019/0007669 A1 | 1/2019 | Kim et al. |
| 2019/0007679 A1 | 1/2019 | Coban et al. |
| 2019/0007684 A1 | 1/2019 | Van der Auwera et al. |
| 2019/0012766 A1 | 1/2019 | Yoshimi |
| 2019/0014304 A1 | 1/2019 | Curcio et al. |
| 2019/0026956 A1 | 1/2019 | Gausebeck et al. |
| 2019/0028642 A1 | 1/2019 | Fujita et al. |
| 2019/0045212 A1 | 2/2019 | Rose et al. |
| 2019/0057487 A1 | 2/2019 | Cheng |
| 2019/0057496 A1 | 2/2019 | Ogawa et al. |
| 2019/0082184 A1 | 3/2019 | Hannuksela |
| 2019/0104315 A1 | 4/2019 | Guo et al. |
| 2019/0108611 A1 | 4/2019 | Izumi |
| 2019/0132521 A1 | 5/2019 | Fujita et al. |
| 2019/0132594 A1 | 5/2019 | Chung et al. |
| 2019/0141318 A1 | 5/2019 | Li et al. |
| 2019/0158800 A1 | 5/2019 | Kokare et al. |
| 2019/0200016 A1 | 6/2019 | Jang et al. |
| 2019/0215512 A1 | 7/2019 | Lee et al. |
| 2019/0215532 A1 | 7/2019 | He et al. |
| 2019/0230285 A1 | 7/2019 | Kim |
| 2019/0230337 A1 | 7/2019 | Kim |
| 2019/0230377 A1* | 7/2019 | Ma ............... H04N 19/105 |
| 2019/0236990 A1 | 8/2019 | Song et al. |
| 2019/0238888 A1 | 8/2019 | Kim |
| 2019/0246141 A1 | 8/2019 | Kim et al. |
| 2019/0253622 A1 | 8/2019 | Van der Auwera et al. |
| 2019/0253624 A1 | 8/2019 | Kim |
| 2019/0268594 A1 | 8/2019 | Lim et al. |
| 2019/0273929 A1 | 9/2019 | Ma et al. |
| 2019/0273949 A1 | 9/2019 | Kim et al. |
| 2019/0281217 A1 | 9/2019 | Kim |
| 2019/0281290 A1 | 9/2019 | Lee et al. |
| 2019/0289324 A1 | 9/2019 | Budagavi |
| 2019/0289331 A1 | 9/2019 | Byun |
| 2019/0297341 A1 | 9/2019 | Zhou |
| 2019/0297350 A1 | 9/2019 | Lin et al. |
| 2019/0306515 A1 | 10/2019 | Shima |
| 2019/0387251 A1 | 12/2019 | Lin et al. |
| 2020/0029077 A1 | 1/2020 | Lee et al. |
| 2020/0036976 A1 | 1/2020 | Kanoh et al. |
| 2020/0045323 A1 | 2/2020 | Hannuksela |
| 2020/0074687 A1 | 3/2020 | Lin et al. |
| 2020/0077092 A1 | 3/2020 | Lin et al. |
| 2020/0084441 A1 | 3/2020 | Lee et al. |
| 2020/0120340 A1 | 4/2020 | Park et al. |
| 2020/0120359 A1 | 4/2020 | Hanhart et al. |
| 2020/0137401 A1 | 4/2020 | Kim et al. |
| 2020/0162731 A1 | 5/2020 | Kim et al. |
| 2020/0213570 A1 | 7/2020 | Shih et al. |
| 2020/0213571 A1 | 7/2020 | Kim et al. |
| 2020/0213587 A1 | 7/2020 | Galpin et al. |
| 2020/0244957 A1 | 7/2020 | Sasai et al. |
| 2020/0252650 A1 | 8/2020 | Shih et al. |

FOREIGN PATENT DOCUMENTS

| | | |
|---|---|---|
| JP | 2012-160886 A | 8/2012 |
| JP | 2014-176034 A | 9/2014 |
| KR | 2017-0015938 A | 2/2017 |
| WO | WO 2012/044709 A1 | 4/2012 |
| WO | WO 2015/138979 A2 | 9/2015 |
| WO | WO 2015/184416 A1 | 12/2015 |
| WO | WO 2016/076680 A1 | 5/2016 |
| WO | WO 2016/140060 A1 | 9/2016 |
| WO | WO 2017/125030 A1 | 7/2017 |
| WO | WO 2017/127816 A1 | 7/2017 |
| WO | WO 2018/118159 A1 | 6/2018 |

OTHER PUBLICATIONS

Tosic et al.; "Multiresolution Motion Estimation for Omnidirectional Images"; IEEE 13$^{th}$ European Signal Processing Conf.; Sep. 2005; 4 pages.

Li et al.; "Projection Based Advanced Motion Model for Cubic Mapping for 360-Degree Video"; Cornell University Library; 2017; 5 pages.

Zheng et al.; "Adaptive Selection of Motion Models for Panoramic Video Coding"; IEEE Int'l Conf. Multimedia and Expo; Jul. 2007; p. 1319-1322.

He et al.; "AHG8: Algorithm description of InterDigital's projection format conversion tool (PCT360)"; Joint Video Exploration Team; ITU-T SG 16 WP 3 and ISO/IEC JTC 1/SC 29/WG 11; Doc. JVET-D0090; Oct. 2016; 6 pages.

International Patent Application No. PCT/US2017/051542; Int'l Search Report and the Written Opinion; dated Dec. 7, 2017; 17 pages.

International Patent Application No. PCT/US2017/051542; Int'l Preliminary Report on Patentability; dated Jul. 4, 2019; 10 pages.

He et al.; "AHG8: InterDigital's projection format conversion tool"; Joint Video Exploration Team (JVET) of ITU-T SG 16 WP3 and ISO/IEC JTC 1/SC 29/WG 11 4$^{th}$ meeting; Oct. 2016; 18 pages.

Kammachi et al.; "AHG8: Test results for viewport-dependent pyramid, cube map, and equirectangular panorama schemes"; JVET-D00078; Oct. 2016; 7 pages.

Yip et al.; "Technologies under Considerations for ISO/IEC 23000-20 Omnidirectional Media Application Format"; ISO/IEC JTC1/SC29/WG11 MPEG2017/W16637; Jan. 2017; 50 pages.

International Patent Application No. PCT/US2018/018246; Int'l Search Report and the Written Opinion; dated Apr. 20, 2018; 15 pages.

He et al.; "AHG8: Geometry padding for 360 video coding"; Joint Video Exploration Team (JVET); Document: JVET-D0075; Oct. 2016; 10 pages.

Vishwanath et al.; "Rotational Motion Model for Temporal Prediction in 360 Video Coding"; IEEE 19$^{th}$ Int'l Workshop on Multimedia Signal Processing; Oct. 2017; 6 pages.

Sauer et al.; "Improved Motion Compensation for 360 Video Projected to Polytopes" Proceedings of the IEEE Int'l Conf. on Multimedia and Expo; Jul. 2017; p. 61-66.

International Patent Application No. PCT/US2018/017124; Int'l Search Report and the Written Opinion; dated Apr. 30, 2018; 19 pages.

Choi et al.; "Text of ISO/IEC 23000-20 CD Omnidirectional Media Application Format"; Coding of Moving Pictures and Audio; ISO/IEC JTC1/SC29/WG11 N16636; Jan. 2017; 48 pages.

International Patent Application No. PCT/US2018/018246; Int'l Preliminary Report on Patentability; dated Sep. 6, 2019; 8 pages.

International Patent Application No. PCT/US2018/017124; Int'l Preliminary Report on Patentability; dated Aug. 29, 2019; 12 pages.

(56) References Cited

OTHER PUBLICATIONS

Sauer et al.; "Geometry correction for motion compensation of planar-projected 360VR video"; Joint Video Exploration Team; Document: JVET-D0067; Oct. 2016; 13 pages.

* cited by examiner

100

200

300

400

500

Input Picture 610

Reference Picture 620

600

700

800

900

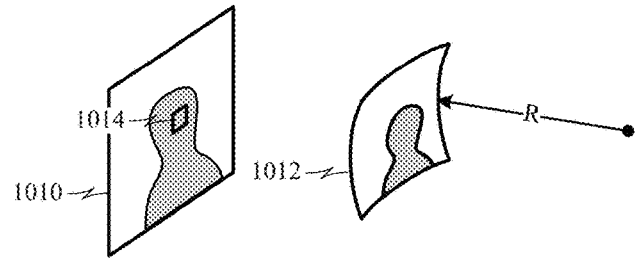
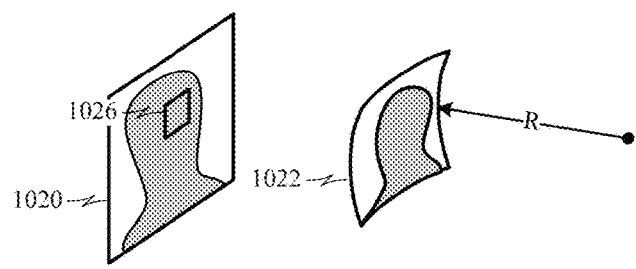
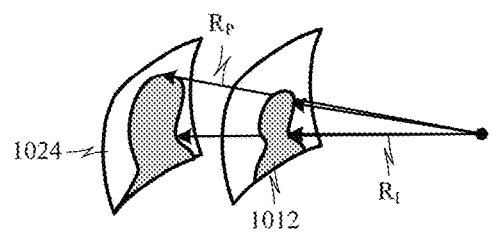
FIG. 10
1000
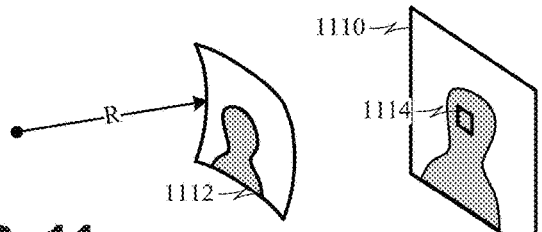
FIG. 11
1100
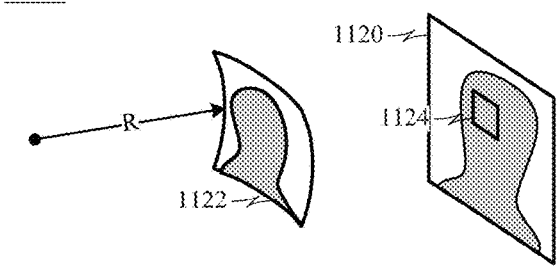
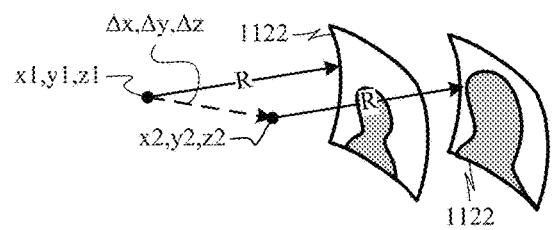

1200

1300

SPHERE PROJECTED MOTION ESTIMATION/COMPENSATION AND MODE DECISION

BACKGROUND

The present disclosure relates to coding of 360° video to achieve bandwidth compression and, in particular, to techniques for processing 360° video using compression algorithms that were designed to process two-dimensional video data.

The term "360° video" refers to video recordings where views in multiple directions, sometimes in all directions about a camera, are recorded at the same time. The 360° video may be captured using an omnidirectional camera or a collection of cameras that capture image data from different but overlapping fields of view and whose outputs are stitched together. A viewer of a 360° video may be given control over viewing direction during playback, which allows the viewer to navigate within the video's field of view.

Although 360° video captures image information from a three-dimensional space, the video data itself often is represented by image data in a two-dimensional format. The image data is represented by an array of pixels arranged at predetermined spatial locations in two dimensions (e.g., x, y locations). And, while objects at different depths within a field of view will be represented in the image data having sizes that correspond not only to the object's physical size but also to its distance from a camera, the pixel data that represents the objects do not vary pixel locations by depth.

The two-dimensional representation of a three-dimensional space can cause distortions of image data in different locations in a field of view. For example, straight lines in a three-dimensional spare might not appear as straight lines in two-dimensional image data. Moreover, the sizes and shapes of different objects may become distorted as they move about within the field of view of a 360° image. These changes pose challenges to processing systems that operate on such image data.

As one example, the distortions can cause issues in video coding. Video coders typically reduce bandwidth of image signals by exploiting spatial and temporal redundancies in image data. Such redundancies, however, are not always detected by video coders that operate on two-dimensional representations of three-dimensional images due to the distortions that can arise from frame to frame. When such video coders fail to detect redundancies in content, they often generate coded representations of image data that are not as bandwidth-efficient as they could be.

Accordingly, the inventors perceive a need in the art for a video coding system that better recognizes redundancies in two-dimensional representations of three-dimensional image content, such as with 360° video.

BRIEF DESCRIPTION OF THE DRAWINGS

FIG. 10 illustrates an exemplary spherical projection that may be performed by another embodiment of the present disclosure.

FIG. 11 illustrates an exemplary spherical projection that may be performed by a further embodiment of the present disclosure.

DETAILED DESCRIPTION

Embodiments of the present disclosure provide techniques for coding video data predictively based on predictions made from spherical-domain projections of input pictures to be coded and reference pictures that are prediction candidates. Spherical projection of an input picture and the candidate reference pictures may be generated. Thereafter, a search may be conducted for a match between the spherical-domain representation of a pixel block to be coded and a spherical-domain representation of the reference picture. On a match, an offset may be determined between the spherical-domain representation of the pixel block to a matching portion of the of the reference picture in the spherical-domain representation. The spherical-domain offset may be transformed to a motion vector in a source-domain representation of the input picture, and the pixel block may be coded predictively with reference to a source-domain representation of the matching portion of the reference picture.

Figure 1:
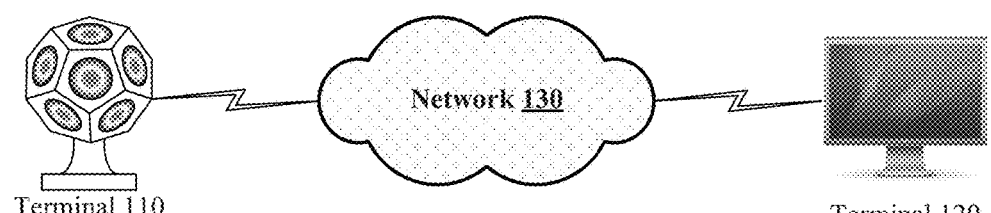
FIG. 1 illustrates a system for exchange of 360° video.

FIG. 1 illustrates a system 100 in which embodiments of the present disclosure may be employed. The system 100 may include at least two terminals 110-120 interconnected via a network 130. The first terminal 110 may have a camera system 112 that captures 360° video. The terminal 110 also may include coding systems and transmission systems (not shown) to transmit coded representations of the 360° video to the second terminal 120, where it may be consumed. For example, the second terminal 120 may display the 360° video on a local display, it may execute a video editing program to modify the 360° video, or may integrate the 360° into an application (for example, a virtual reality program), may present in head mounted display (for example, virtual reality applications) or it may store the 360° video for later use.

FIG. 1 illustrates components that are appropriate for unidirectional transmission of 360° video, from the first terminal 110 to the second terminal 120. In some applications, it may be appropriate to provide for bidirectional exchange of video data, in which case the second terminal 120 may include its own camera system, video coder and transmitters (not shown), and the first terminal 100 may include its own receiver and display (also not shown). If it is desired to exchange 360° video bidirectionally, then the techniques discussed hereinbelow may be replicated to generate a pair of independent unidirectional exchanges of 360° video. In other applications, it would be permissible to transmit 360° video in one direction (e.g., from the first terminal 110 to the second terminal 120) and transmit "flat" video (e.g., video from a limited field of view in a reverse direction.

In FIG. 1, the second terminal 120 is illustrated as a computer display but the principles of the present disclosure are not so limited. Embodiments of the present disclosure find application with laptop computers, tablet computers, smart phones, servers, media players, virtual reality head mounted displays, augmented reality display, hologram displays, and/or dedicated video conferencing equipment. The network 130 represents any number of networks that convey coded video data among the terminals 110-120, including, for example, wireline and/or wireless communication networks. The communication network 130 may exchange data in circuit-switched and/or packet-switched channels. Representative networks include telecommunications networks, local area networks, wide area networks and/or the Internet. For the purposes of the present discussion, the architecture and topology of the network 130 is immaterial to the operation of the present disclosure unless explained hereinbelow.

Figure 2:
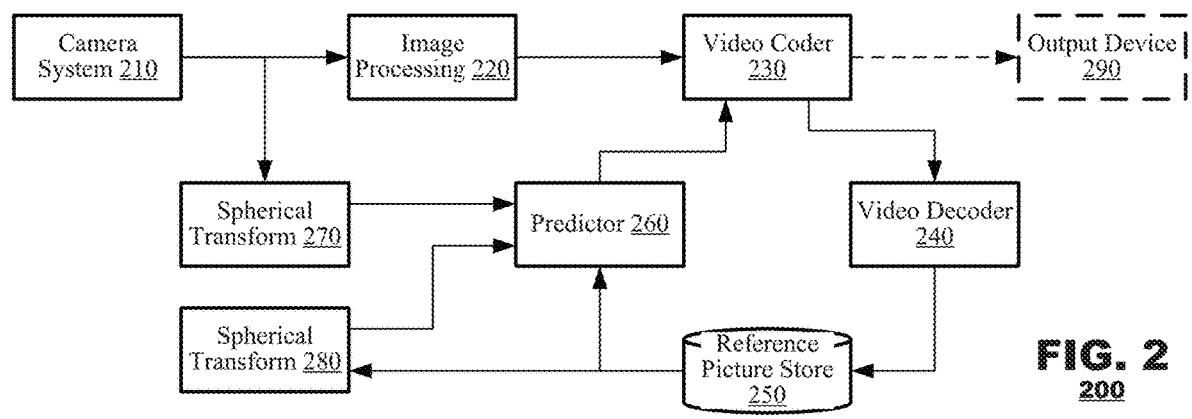
FIG. 2 is a functional block diagram of a coding system according to an embodiment of the present disclosure.

FIG. 2 is a functional block diagram of a coding system 200 according to an embodiment of the present disclosure. The system 200 may include a camera system 210, an image processing system 220, a video coder 230, a video decoder 240, a reference picture store 250, a predictor 260 and a pair of spherical transform units 270, 280. The camera system 210 may generate image data representing a local environment as a so-called "360° image," containing image data of a field of view that extends around the camera system 210 in all directions. The image processing system 220 may convert the image data from the camera system 210 as needed to fit requirements of the video coder 230. The video coder 230 may generate a coded representation of its input image data, typically by exploiting spatial and/or temporal redundancies in the image data. The video coder 230 may output a coded representation of the input data that consumes less bandwidth than the input data when transmitted and/or stored.

The video decoder 240 may invert coding operations performed by the video encoder 230 to obtain a reconstructed picture from the coded video data. Typically, the coding processes applied by the video coder 230 are lossy processes, which cause the reconstructed picture to possess various errors when compared to the original picture. The video decoder 240 may reconstruct picture of select coded pictures, which are designated as "reference pictures," and store the decoded reference pictures in the reference picture store 250. In the absence of transmission errors, the decoded reference pictures will replicate decoded reference pictures obtained by a decoder (not shown in FIG. 2).

The predictor 260 may select prediction references for new input pictures as they are coded. For each portion of the input picture being coded (called a "pixel block" for convenience), the predictor 260 may select a coding mode and identify a portion of a reference picture that may serve as a prediction reference search for the pixel block being coded. The coding mode may be an intra-coding mode, in which ease the prediction reference may be drawn from a previously-coded (and decoded) portion of the picture being coded. Alternatively, the coding mode may be an inter-coding mode, in which case the prediction reference may be drawn front another previously-coded and decoded picture.

In an embodiment, the predictor 260 may search for prediction references of pictures being coded operating on input picture and reference picture that has been transformed to a spherical projection representation. The spherical transform units 270, 280 may transform the input picture and the reference picture to the spherical projection representations.

When an appropriate prediction reference is identified, the predictor 260 may furnish the prediction data to the video coder 230 in a representation that the video coder 230 accepts. Typically, the reference picture(s) stored in the reference picture store will be in a format that the video coder accepts.

As indicated, the coded video data output by the video coder 230 should consume less bandwidth than the input data when transmitted and/or stored. The coding system 200 may output the coded video data to an output device 290, such as a transmitter (not shown) that may transmit the coded video data across a communication network 130 (FIG. 1) or a storage device (also not shown) such as an electronic-, magnetic- and/or optical storage medium.

Figure 3:
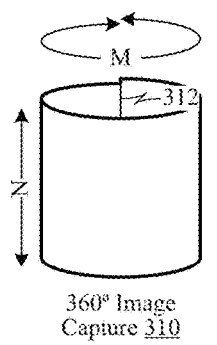
FIG. 3 illustrates an exemplary transform that may be performed for spherical projection in an embodiment of the present disclosure.
Figure 3:
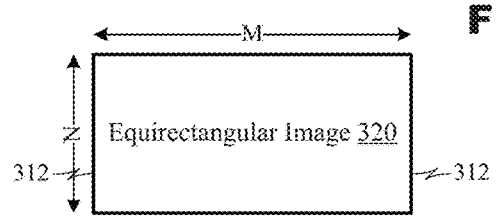
Figure 3:
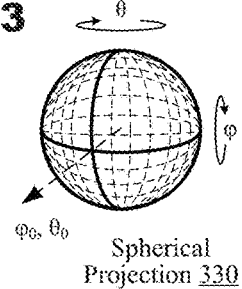

FIG. 3 illustrates exemplary transforms that may be performed by the spherical transform units 270, 280 of FIG. 2 in a first embodiment. In this embodiment, a camera system 210 (FIG. 2) may perform a 360° capture operation 310 and output an equirectangular picture 320 having dimensions M×N pixels. The equirectangular picture 320 may represent a 360° field of view having been partitioned along a slice 312 that divides a cylindrical field of view into a two dimensional array of data. In the equirectangular picture 320, pixels on either side of the slice 312 represent adjacent image content even though they appear on different edges of the equirectangular picture 320.

The spherical transform unit 270 may transform pixel data at locations (x, y) within the equirectangular picture 320 to locations (θ, φ) along a spherical projection 330 according to a transform such as:

$$\theta = x + \theta_0, \text{ and} \quad (\text{Eq. 1.})$$

$$\varphi = y + \varphi_0, \text{ where} \quad (\text{Eq. 2.})$$

θ and φ respectively represents the longitude and latitude of a location in the spherical projection 330, $\theta_0$, $\varphi_0$ represent an origin of the spherical projection 330, and x and y represent the horizontal and vertical coordinates of the source data in the equirectangular picture 320.

When applying the transform, the spherical transform unit 270 may transform each pixel location along a predetermined row of the equirectangular picture 320 to have a unique location at an equatorial latitude in the spherical projection 330. In such regions, each location in the spherical projection 330 may be assigned pixel values from corresponding locations of the equirectangular picture 320. At other locations, particularly toward poles of the spherical projection 330, the spherical projection unit 270 may map several source locations from the equirectangular picture 320 to a common location in the spherical projection 330. In such a case, the spherical projection unit 270 may derive pixel values for the locations in the spherical projection 330 from a blending of corresponding pixel values in the equirectangular picture 320 (for example, by averaging pixel values at corresponding locations of the equirectangular picture 320).

Figure 4:
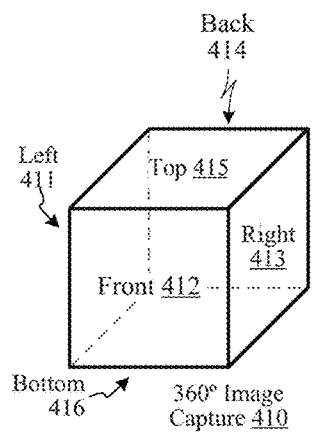
FIG. 4 illustrates an exemplary transform that may performed for spherical projection in another embodiment of the present disclosure.
Figure 4:
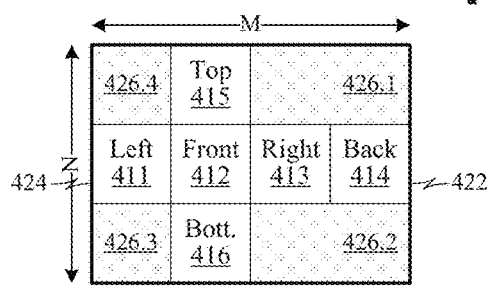
Figure 4:
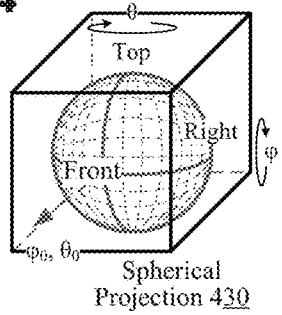

FIG. 4 illustrates exemplary transforms that may be performed by the spherical transform units 270, 250 of FIG. 2 in another embodiment. In this embodiment, a camera system 110 (FIG. 2) may perform a 360° capture operation 410 and output an picture 420 having dimensions M×N pixels in which image content is arranged according to a cube map. The image capture 410 may capture image data in each of a predetermined number of directions (typically, six) which are stitched together according to the cube map layout. In the example illustrated in FIG. 4, six sub-images corresponding to a left view 411, a front view 412, a right view 413, a back view 414, a top view 415 and a bottom view 416 may be captured and arranged within the cube map picture 420 according to "seams" of image content between the respective views. Thus, as illustrated in FIG. 4, pixels from the front image that are adjacent to the pixels from each of the top, the left, the right and the bottom images represent image content that is adjacent respectively to content of the adjoining sub-images. Similarly, pixels from the right and back images that are adjacent to each other represent adjacent image content. Further, content from a terminal edge 422 of the back image is adjacent to content from an opposing terminal edge 424 of the left image. The cube map picture 420 also may have regions 426.1-426.4 that do not belong to any image.

The spherical transform unit 270 may transform pixel data at locations (x, y) within the cube map picture 420 to locations (θ, φ) along a spherical projection 330 according to transforms derived from each sub-image in the cube map. FIG. 4 illustrates six faces 411-416 of the image capture 410 superimposed over the spherical projection 430 that is to be generated. Each sub-image of the image capture corresponds to a predetermined angular region of a surface of the spherical projection 430. Thus, image data of the front face 412 may be projected to a predetermined portion on the surface of the spherical projection, and image data of the left, right, back, top and bottom sub-images may be projected on corresponding portions of the surface of the spherical projection.

In a cube map having square sub-images, that is, height and width of the sub-images 411-416 are equal, each sub-image projects to a 90°×90° region of the projection surface. Thus, each position x, y with a sub-image maps to a θ, φ location on the spherical projection 430 based on a sinusoidal projection of the form $\varphi=f^k(x, y)$ and $\theta=g^k(x, y)$, where x, y represent displacements from a center of the cube face k for top, bottom, front, right, left, right and θ, φ represent angular deviations in the sphere.

When applying the transform, some pixel locations in the cube map picture 420 may map to a unique location in the spherical projection 430. In such regions, each location in the spherical projection 430 may be assigned pixel values from corresponding locations of the cube map picture 420. At other locations, particularly toward edges of the respective sub-images, the spherical projection unit 270 may map image data from several source locations in the cube map picture 420 to a common location in the spherical projection 430. In such a case, the spherical projection unit 270 may derive pixel values for the locations in the spherical projection 430 from a blending of corresponding pixel values in the cube map picture 420 (for example, by a weighted averaging pixel values at corresponding locations of cube map picture 420).

The techniques of the present disclosure find application with other types of image capture techniques. For example, truncated pyramid-, tetrahedral-, octahedral-, dodecahedral- and icosahedral-based image capture techniques may be employed. Images obtained therefrom may be mapped to a spherical projection through analogous techniques.

Returning to FIG. 2, a predictor 260 may perform prediction searches using image data obtained by spherical projection. Thus, the spherical transform unit 270 may transform image data captured by the imaging system into a spherical projection and the second spherical transform unit 280 may transform candidate reference pictures into other spherical projections. The predictor 260 may search for prediction reference data to be used by the video coder 230 in the spherical domain. Once an appropriate prediction match is identified, the predictor 260 may furnish prediction data from the reference picture store 250 in the format that is accepted by the video coder 230 (e.g., without transforming it to the spherical projection).

Figure 5:
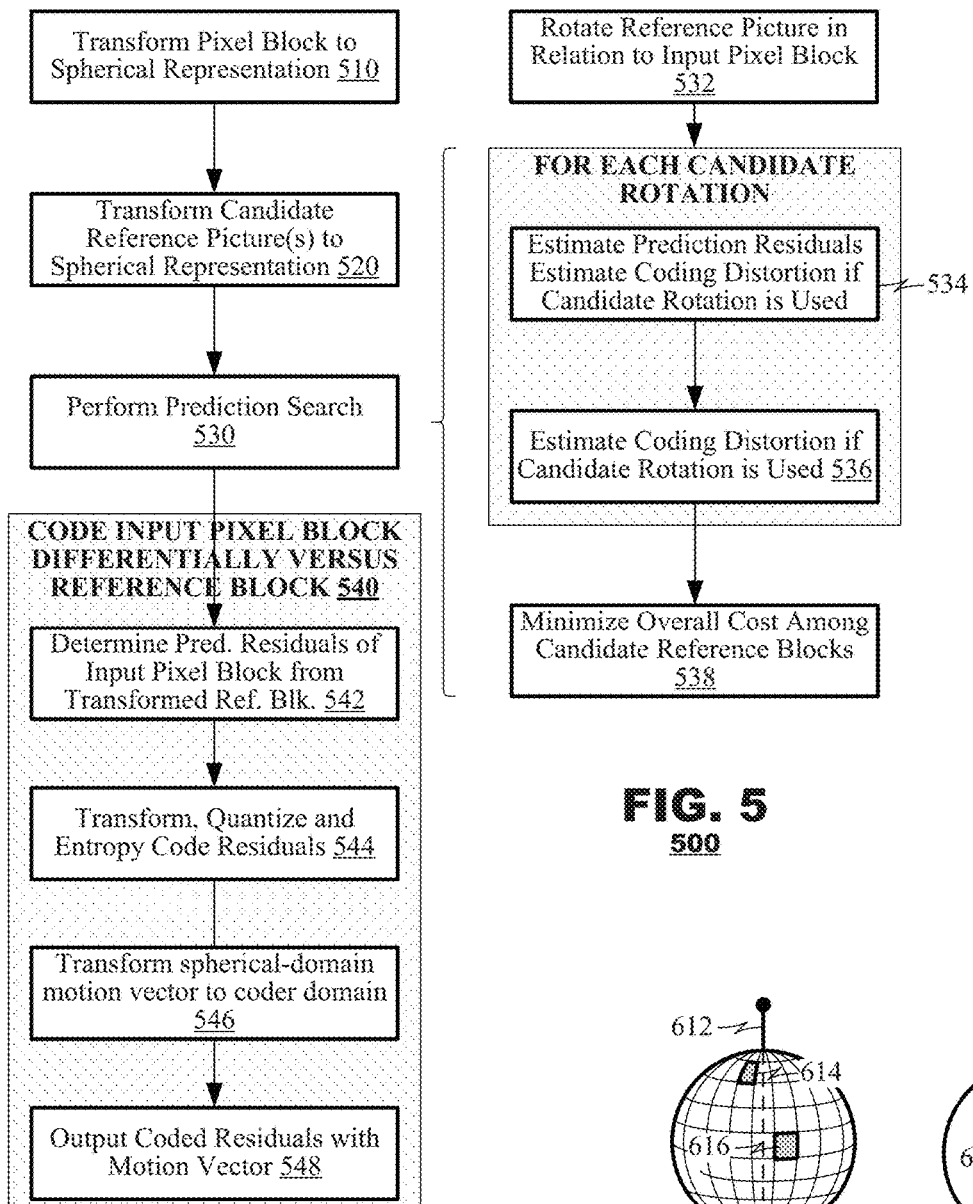
FIG. 5 illustrates a coding method according to an embodiment of the present disclosure.

FIG. 5 illustrates a coding method 500 according to an embodiment of the present disclosure. The method 500 may operate on a pixel block by pixel block basis to code a new input picture that is to be coded. The method 500 may begin by transforming data of an input pixel block to a spherical representation (box 510). The method 300 also may transform a candidate reference picture to the spherical representation (box 520). Thereafter, the method 500 may perform a prediction search (box 530) from a comparison between the transformed pixel block data and transformed reference picture data. When an appropriate prediction reference is found, the method 500 may code the input pixel block differentially using the matching reference picture data (the "reference block," for convenience) as a basis for prediction (box 540). Typically, this differential coding includes a calculation of pixel residuals from a pixel-wise subtraction of prediction block data from the input pixel block data (box 542) and a transformation, quantization and entropy coding of the pixel residuals obtained therefrom (box 544). In this regard, the method 500 may adhere to coding protocols defined by a prevailing coding specification, such as ITU H.265 (also known as "HEVC"), H.264 (also, "AVC") or a predecessor coding specification. These specifications define protocols for defining pixel blocks, defining search windows for prediction references, and for performing differential coding of pixel blocks with reference to reference blocks. The method 500 also may transform spherical-domain representation of the motion vector to a coder-domain representation, the representation used by the video coding specification (box 546). The method 500 may output the coded pixel residuals, motion vectors and other metadata associated with prediction (typically, coding mode indicators and reference picture IDs) (box 548).

The prediction search (box 530) may be performed to maximize bandwidth conservation and to minimize information losses. The method 500 may perform operations to estimate when appropriate prediction reference(s) are found. In an embodiment, for each input pixel block, the method 500 may rotate the spherical projection of the reference frame about a plurality of candidate rotations with respect to the transformed input pixel block (box 532). At each candidate rotation, the method may estimate prediction residuals that would be obtained if the candidate rotation were used (box 534). These computations may be performed by a pixel-wise comparison of the spherically-projected input pixel block and a portion of the rotated candidate reference frame that aligns with the location of the input pixel block. Typically, when the comparisons generate pixel residuals of high magnitude and high variance will lead to lower coding efficiencies than comparisons of other candidate pixel blocks that generate pixel residuals having lower magnitude and lower variance. The method 500 also may estimate coding distortions that would arise if the candidate reference block were used (box 536). These computations may be performed by estimating loss of pixel residuals based on quantization parameter levels that are predicted to be applied to the input pixel block, again operating in a domain of the spherical projection. Once estimates have been obtained for all candidate reference blocks under consideration, the method 500 may select the reference pixel block that minimizes overall coding cost (box 538).

For example, the coding cost J of an input pixel block with reference to a candidate "reference block" $BLK_{\alpha,\beta,\gamma}$ that aligns with the location of the input pixel block when the reference frame is rotated by an angle $\alpha$, $\beta$, $\gamma$ may be given as:

$$J=\text{Bits}(BLK_{\alpha,\beta,\gamma})+k^*\text{DIST}(BLK_{\alpha,\beta,\gamma}), \text{ where} \quad (\text{Eq. 3.})$$

$\text{Bits}(BLK_{\alpha,\beta,\gamma})$ represents a number of bits estimated to be required to code the input pixel block with reference to the reference block $BLK_{\alpha,\beta,\gamma}$ and $\text{DIST}(BLK_{\alpha,\beta,\gamma})$ represents the distortion that would be obtained from coding the input pixel block with reference to the reference block $BLK_{\alpha,\beta,\gamma}$ and k may be an operator-selected scalar to balance contribution of these factors. As explained, the method 500 may be performed to select a reference pixel block that minimizes the value J.

Figure 6:
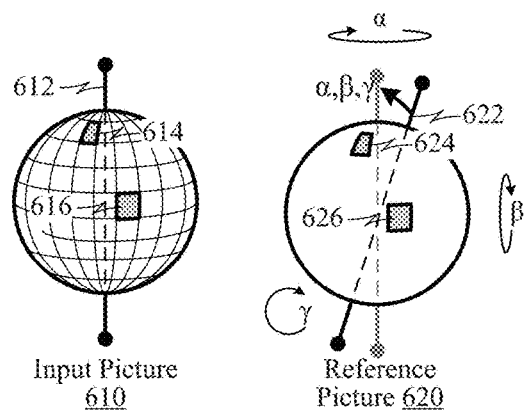
FIG. 6 illustrates an exemplary spherical projection that may be performed by an embodiment of the present disclosure.

FIG. 6 figuratively illustrates prediction operations between a spherical protection of an input frame 610 and a spherical projection of a reference frame 620 according to the embodiment of FIG. 5. As discussed, the two-dimensional representation of the input frame may be parsed into a plurality of pixel blocks, which are to be coded. These pixel blocks may have corresponding projections in the spherical projection of the input frame 610 as shown in FIG. 6. The blocks' sizes and shapes may vary according to their locations in the spherical projection. For example, pixel blocks that, in the two-dimensional representation, are located toward top and bottom edges of an image may project to shapes that are triangular in the spherical projection of the input frame 610 and will be located toward polar regions of the spherical projection. Pixel blocks that are located along rows in the middle of the two-dimensional representation may project to shapes that are approximately rectangular and will be located toward equatorial regions of the spherical project. Pixel blocks from the two-dimensional representation that map to intermediate locations between the equatorial regions and the polar regions may have generally trapezoidal shapes. All such representations of pixel blocks to the spherical projection may be considered under the method 500 of FIG. 5 even though their shapes vary from pixel block to pixel block.

FIG. 6 also illustrates an exemplary rotation of a spherical projection of a reference frame 620. Here, an axis 622 of the spherical projection of the reference frame 620 is shown as rotated by an angle $\alpha$, $\beta$, $\gamma$ from its original position. When coding pixel blocks 614, 616 of the input frame, the method 500 of FIG. 5 may perform pixel-wise comparisons between pixels in the spherical projection of the input frame to pixels in co-located reference blocks (shown as blocks 624, 626 respectively) in the spherical projection of the reference frame 620. Here, again, reference blocks may vary in size and shapes at different locations in the spherical projection of the reference picture 620.

When a predict on reference is selected for an input pixel block, the angle of rotation $\alpha$, $\beta$, $\gamma$ that corresponds to the selected prediction reference may be converted to a motion vector in the two-dimensional space of the reference picture. This motion vector may be transmitted as part of coded video data of the input pixel block.

Motion vectors for many coding protocols, such as HEVC and AVC, are limited to describing spatial displacements (e.g., x and y directions) in the two-dimensional domain of the input frames and references frames. It may occur that the angle of rotation $\alpha$, $\beta$, $\gamma$ for a given prediction search maps to a spatial location in the two-dimensional domain that is both displaced by x and y directions and also is rotated with respect to a source pixel block. In one embodiment, if desired to utilize the principles of the present disclosure with such video coders, input pixel blocks may be coded using prediction references that are identified solely by the x and y displacements obtained from a conversion of the motion vector from the spherical domain to the two-dimensional domain. In other words, if an angle of rotation $\alpha$, $\beta$, $\gamma$ in the spherical domain converts to a motion vector of the form $\Delta x$, $\Delta y$ and $\lambda$ (where $\lambda$ represents a rotation of a pixel block in the two-dimensional spare), a video coder may perform prediction using a prediction reference selected by a motion vector of the form $\Delta x$, $\Delta y$, where $\lambda$ is ignored. However, better performance is expected to be achieved where motion vectors for prediction may be represented fully, for example, in either a $\Delta x$, $\Delta y$, $\lambda$ format or a $\alpha$, $\beta$, $\gamma$ format; these alternate embodiments are discussed hereinbelow.

Many coding applications perform motion estimation at granularities smaller than an individual pixel of a reference picture. For example, in the HEVC and H.264 protocols, video coders perform motion estimation at quarter-pixel and/or half-pixel increments. In an embodiment, a video encoder may perform spatial interpolation to develop image data sufficient to perform motion estimation at these smaller granularities. For example, the video encoder may perform interpolation to find a matching reference pixel to the source pixel with finer rotation angle. In this manner, the spherically-projected rotation data may contain sufficient information to perform prediction searches as such granularities.

The foregoing process also may be applied for use in intra-coding. When an input pixel block is to be coded, it may be coded with reference to previously-coded image data of the same frame in which the pixel block is located. Thus, referring to FIG. 6, by the time pixel block 616 is to be coded, coded data for several other pixel blocks (including block 614) will have been coded and transmitted to a decoder. Both the encoder and the decoder will have decoded data of those pixel blocks, which may be used as a source of prediction for pixel block 616. According to an embodiment a video coder may search for appropriate prediction data within the previously-coded and decoded image data of the current frame, by rotating the coded image data through various permutations of $\alpha$, $\beta$, $\gamma$ to identify a prediction reference on an intra-coding basis. Also the direction of intra prediction in 2D can be reflected in sphere of 610 as block 616 is changed into wedge-like shape. For example, vertical direction for prediction in 2D frame can be mapped accordingly in 610 with interpolation. The video coder may estimate a coding cost J of the candidate prediction references according to the techniques of Eq. 3.

Figure 7:
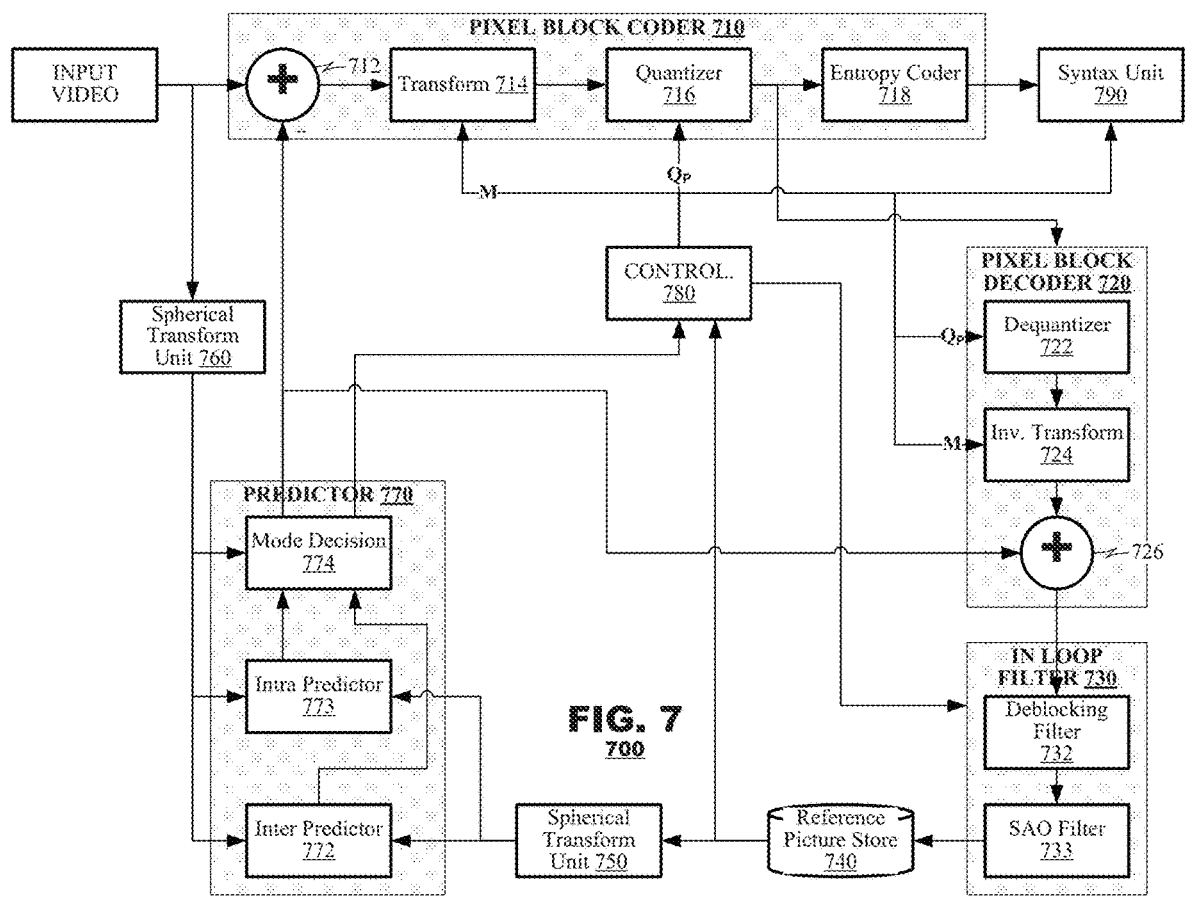
FIG. 7 is a functional block diagram of a coding system according to an embodiment of the present disclosure.

FIG. 7 is a functional block diagram of a coding system 700 according to an embodiment of the present disclosure. The system 700 may include a pixel block coder 710, a pixel block decoder 720, an in-loop filter system 730, a reference picture store 740, a pair of spherical transform units 750, 760, a predictor 770, a controller 780, and a syntax unit 790. The pixel block coder and decoder 710, 720 and the predictor 770 may operate iteratively on individual pixel blocks of a picture. The predictor 770 may predict data for use during coding of a newly-presented input pixel block. The pixel block coder 710 may code the new pixel block by predictive coding techniques and present coded pixel block data to the syntax unit 790. The pixel block decoder 720 may decode the coded pixel block data, generating decoded pixel block data therefrom. The in-loop filter 730 may perform various filtering operations on a decoded picture that is assembled front the decoded pixel blocks obtained by the pixel block decoder 720. The filtered picture may be stored in the reference picture store 740 where it may be used as a source of prediction of a later-received pixel block. The syntax unit 790 may assemble a data stream from the coded pixel block data which conforms to a governing coding protocol.

The pixel block coder 710 may include a subtractor 712, a transform unit 714, a quantizer 716, and an entropy coder 718. The pixel block coder 710 may accept pixel blocks of input data at the subtractor 712. The subtractor 712 may receive predicted pixel blocks from the predictor 770 and generate an array of pixel residuals therefrom representing a difference between the input pixel block and the predicted pixel block. The transform unit 714 may apply a transform to the sample data output from the subtractor 712, to convert data from the pixel domain to a domain of transform coefficients. The quantizer 716 may perform quantization of transform coefficients output by the transform unit 714. The quantizer 716 may be a uniform or a non-uniform quantizer. The entropy coder 718 may reduce bandwidth of the output of the coefficient quantizer by coding the output, for example, by variable length code words.

The transform unit 714 may operate in a variety of transform modes as determined by the controller 780. For example, the transform unit 714 may apply a discrete cosine transform (DCT), a discrete sine transform (DST), a Walsh-Hadamard transform, a Haar transform, a Daubechies wavelet transform, or the like. In an embodiment, the controller 780 may select a coding mode M to be applied by the transform unit 715, may configure the transform unit 715 accordingly and may signal the coding mode M in the coded video data, either expressly or impliedly.

The quantizer 716 may operate according to a quantization parameter $Q_P$ that is supplied by the controller 780. In an embodiment, the quantization parameter $Q_P$ may be applied to the transform coefficients as a multi-value quantization parameter, which may vary, for example, across different coefficient locations within a transform-domain pixel block. Thus, the quantization parameter $Q_P$ may be provided as a quantization parameters array.

The pixel block decoder 720 may invert coding operations of the pixel block coder 710. For example, the pixel block decoder 720 may include a dequantizer 722, an inverse transform unit 724, and an adder 726. The pixel block decoder 720 may take its input data from an output of the quantizer 716. Although permissible, the pixel block decoder 720 need not perform entropy decoding of entropy-coded data since entropy coding is a lossless event. The dequantizer 722 may invert operations of the quantizer 716 of the pixel block coder 710. The dequantizer 722 may perform uniform or non-uniform de-quantization as specified by the decoded signal $Q_P$. Similarly, the inverse transform unit 724 may invert operations of the transform unit 714. The dequantizer 722 and the inverse transform unit 724 may use the same quantization parameters $Q_P$ and transform mode M as their counterparts in Me pixel block coder 710. Quantization operations likely will truncate data in various respects and, therefore, data recovered by the dequantizer 722 likely will possess coding errors when compared to the data presented to the quantizer 716 in the pixel block coder 710.

The adder 726 may invert operations performed by the subtractor 712. It may receive the same prediction pixel block from the predictor 770 that the subtractor 712 used in generating residual signals. The adder 726 may add the prediction pixel block to reconstructed residual values output by the inverse transform unit 724 and may output reconstructed pixel block data.

The in-loop filter 730 may perform various filtering operations on recovered pixel block data. For example, the in-loop filter 730 may include a deblocking filter 732 and a sample adaptive offset ("SAO") filter 733. The deblocking filter 732 may filter data at seams between reconstructed pixel blocks to reduce discontinuities between the pixel blocks that arise due to coding. SAO filters may add offsets to pixel values according to an SAO "type," for example, based on edge direction/shape and/or pixel/color component level. The in-loop filter 730 may operate according to parameters that are selected by the controller 780.

The reference picture store 740 may store filtered pixel data for use in later prediction of other pixel blocks. Different types of prediction data are made available to the predictor 770 for different prediction modes. For example, for an input pixel block, intra prediction takes a prediction reference from decoded data of the same picture in which the input pixel block is located. Thus, the reference picture store 740 may store decoded pixel block data of each picture as it is coded. For the same input pixel block, inter prediction may take a prediction reference from previously coded and decoded picture(s) that are designated as reference pictures. Thus, the reference picture store 740 may store these decoded reference pictures.

The spherical transform units 750, 760 may perform transforms of image data to spherical projection representations. The first spherical transform unit 750 may perform its transform on candidate prediction reference data from the reference picture store, whether for intra prediction or inter prediction. The second spherical transform unit 760 may perform its transform on input video data as it is presented to the pixel block coder 710. The spherical transform units 750, 760 may output their transformed data, respectively, to the predictor 770.

As discussed, the predictor 770 may supply prediction data to the pixel block coder 710 for use in generating residuals. The predictor 770 may include an inter predictor 772, an intra predictor 773 and a mode decision unit 774. The inter predictor 772 may receive spherically-projected pixel block data representing a new pixel block to be coded and may search spherical projections of reference picture data from store 740 for pixel block data from reference picture(s) for use in coding the input pixel block. The inter predictor 772 may support a plurality of prediction modes, such as P mode coding and B mode coding. The inter predictor 772 may select an inter prediction mode and an identification of candidate prediction reference data that provides a closest match to the input pixel block being coded. The inter predictor 772 may generate prediction reference metadata such as motion vectors, to identify which portion(s) of which reference pictures were selected as source(s) of prediction for the input pixel block.

The intra predictor 773 may support Intra (I) mode coding. The intra predictor 773 may search from among spherically-projected pixel block data from the same picture as the pixel block being coded that provides a closest match to the spherically-projected input pixel block. The intra predictor 773 also may generate prediction reference indicators to identify which portion of the picture was selected as a source of prediction for the input pixel block.

The mode decision unit 774 may select a final coding mode to be applied to the input pixel block. Typically, as described above, the mode decision unit 774 selects the prediction mode that will achieve the lowest distortion when video is decoded given a target bitrate. Exceptions may arise when coding modes are selected to satisfy other policies to which the coding system 700 adheres, such as satisfying a particular channel behavior, or supporting random access or data refresh policies. When the mode decision selects the final coding mode, the mode decision unit 774 may output a non-spherically-projected reference block from the store 740 to the pixel block coder and decoder 710, 720 and may supply to the controller 780 an identification of the selected prediction mode along with the prediction reference indicators corresponding to the selected mode.

The controller 780 may control overall operation of the coding system 700. The controller 780 may select operational parameters for the pixel block coder 710 and the predictor 770 based on analyses of input pixel blocks and also external constraints, such as coding nitrate targets and other operational parameters. As is relevant to the present discussion, when it selects quantization parameters $Q_P$, the use of uniform or non-uniform quantizers, and/or the transform mode M, it may provide those parameters to the syntax unit 790, which may include data representing those parameters in the data stream of coded video data output by the system 700.

During operation, the controller 780 may revise operational parameters of the quantizer 716 and the transform unit 715 at different granularities of image data, either on a per pixel block basis or on a larger granularity (for example, per picture, per slice, per largest coding unit ("LCU") or another region). In an embodiment, the quantization parameters may be revised on a per-pixel basis within a coded picture.

Additionally, as discussed, the controller 780 may control operation of the in-loop filter 730 and the prediction unit 770. Such control may include, for the prediction unit 770, mode selection (lambda, modes to be tested, search windows, distortion strategies, etc.), and, for the in-loop filter 730 selection of filter parameters, reordering parameters, weighted prediction, etc.

Figure 8:
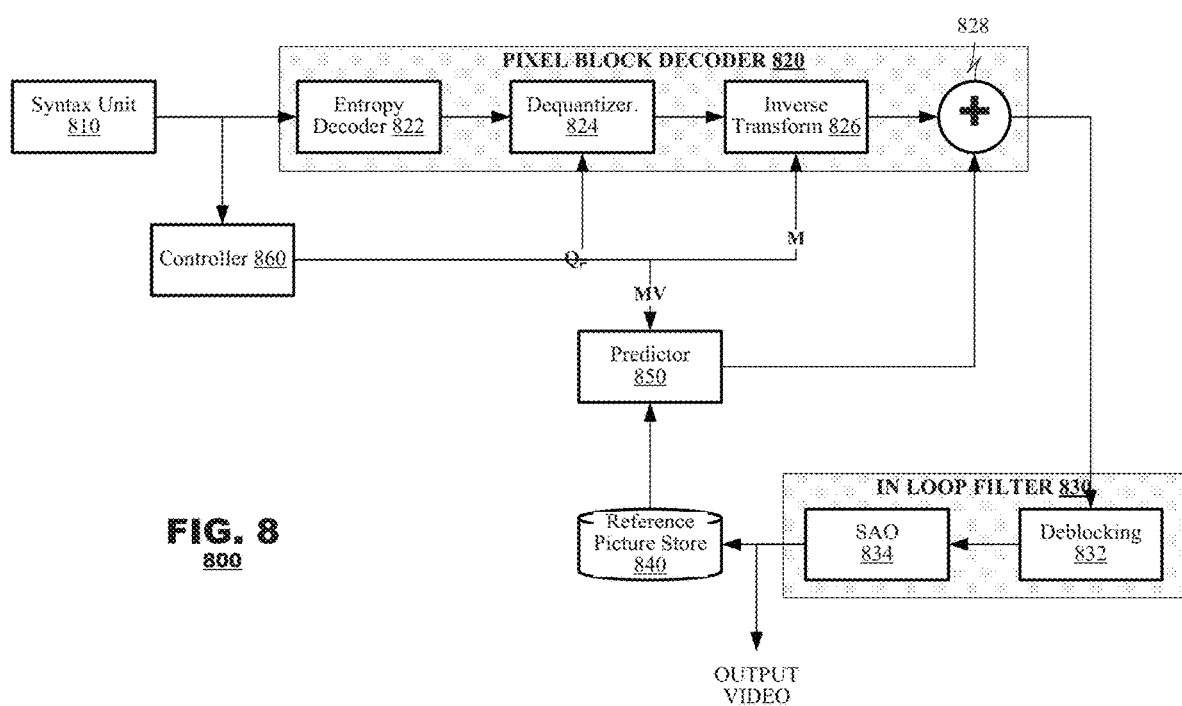
FIG. 8 is a functional block diagram of a decoding system according to an embodiment of the present disclosure.

FIG. 8 is a functional block diagram of a decoding system 800 according to an embodiment of the present disclosure. The decoding system 800 may include a syntax unit 810, a pixel block decoder 820, an in-loop filter 830, a reference picture store 840, a predictor 850 and controller 860. The syntax unit 810 may receive a coded video data stream and may parse the coded data into its constituent parts. Data representing coding parameters may be furnished to the controller 860 while data representing coded residuals (the data output by the pixel block coder 210 of FIG. 2) may be furnished to the pixel block decoder 820. The pixel block decoder 820 may invert coding operations provided by the pixel block coder (FIG. 2). The in-loop filter 830 may filter reconstructed pixel block data. The reconstructed pixel block data may be assembled into pictures for display and output from the decoding system 800 as output video. The pictures also may be stored in the prediction buffer 840 for use in prediction operations. The predictor 850 may supply prediction data to the pixel block decoder 820 as determined by coding data received in the coded video data stream.

The pixel block decoder 820 may include an entropy decoder 822, a dequantizer 824, an inverse transform unit 826, and an adder 828. The entropy decoder 822 may perform entropy decoding to invert processes performed by the entropy coder 718 (FIG. 8). The dequantizer 824 may invert operations of the quantizer 716 of the pixel block coder 710 (FIG. 7). Similarly, the inverse transform unit 826 may invert operations of the transform unit 714 (FIG. 7). They may use the quantization parameters $Q_P$ and transform modes M that are provided in the coded video data stream. Because quantization is likely to truncate data, the data recovered by the dequantizer 824, likely will possess coding errors when compared to the input data presented to its counterpart quantizer 716 in the pixel block coder 210 (FIG. 2).

The adder 828 may invert operations performed by the subtractor 712 (FIG. 7). It may receive a prediction pixel block from the predictor 850 as determined by prediction references in the coded video data stream. The adder 828 may add the prediction pixel block to reconstructed residual values output by the inverse transform unit 826 and may output reconstructed pixel block data.

The in-loop filter 830 may perform various filtering operations on reconstructed pixel block data. As illustrated, the in-loop filter 830 may include a deblocking filter 832 and an SAO filter 834. The deblocking filter 832 may filter data at seams between reconstructed pixel blocks to reduce discontinuities between the pixel blocks that arise due to coding. SAO filters 834 may add offset to pixel values according to an SAO type, for example, based on edge direction/shape and/or pixel level. Other types of in-loop filters may also be used in a similar manner. Operation of the deblocking filter 832 and the SAO filter 834 ideally would mimic operation of their counterparts in the coding system 700 (FIG. 7). Thus, in the absence of transmission errors or other abnormalities, the decoded picture obtained from the in-loop filter 830 of the decoding system 800 would be the same as the decoded picture obtained from the in-loop filter 730 of the coding system 700 (FIG. 7); in this manner, the coding system 700 and the decoding system 800 should store a common set of reference pictures in their respective reference picture stores 740, 840.

The reference picture stores 840 may store filtered pixel data for use in later prediction of other pixel blocks. The reference picture stores 840 may store decoded pixel block data of each picture as it is coded for use in intra prediction. The reference picture stores 840 also may store decoded reference pictures.

As discussed, the predictor 850 may supply prediction data to the pixel block decoder 820. The predictor 850 may supply predicted pixel block data as determined by the prediction reference indicators supplied in the coded video data stream.

The controller 860 may control overall operation of the coding system 800. The controller 860 may set operational parameters for the pixel block decoder 820 and the predictor 850 based on parameters received in the coded video data stream. As is relevant to the present discussion, these operational parameters may include quantization parameters $Q_P$ for the dequantizer 824 and transform modes M for the inverse transform unit 815. As discussed, the received parameters may be set at various granularities of image data, for example on a per pixel block basis, a per picture basis, a per slice basis, a per LCU basis, or based on other types of regions defined for the input image.

In an embodiment, use of spherical transforms by an encoder for selection of prediction references during coding does not require a decoder to use such transforms. In the embodiments illustrated in FIGS. 2 and 7, encoders 200, 700 may perform prediction searches with reference to spherically-projected input data and reference data but the differential video coding 230, 710 itself may be perform using non-spherically projected data. In this manner, embodiments of the present disclosure may be used cooperatively with decoders that do not perform spherical projections.

Figure 9:
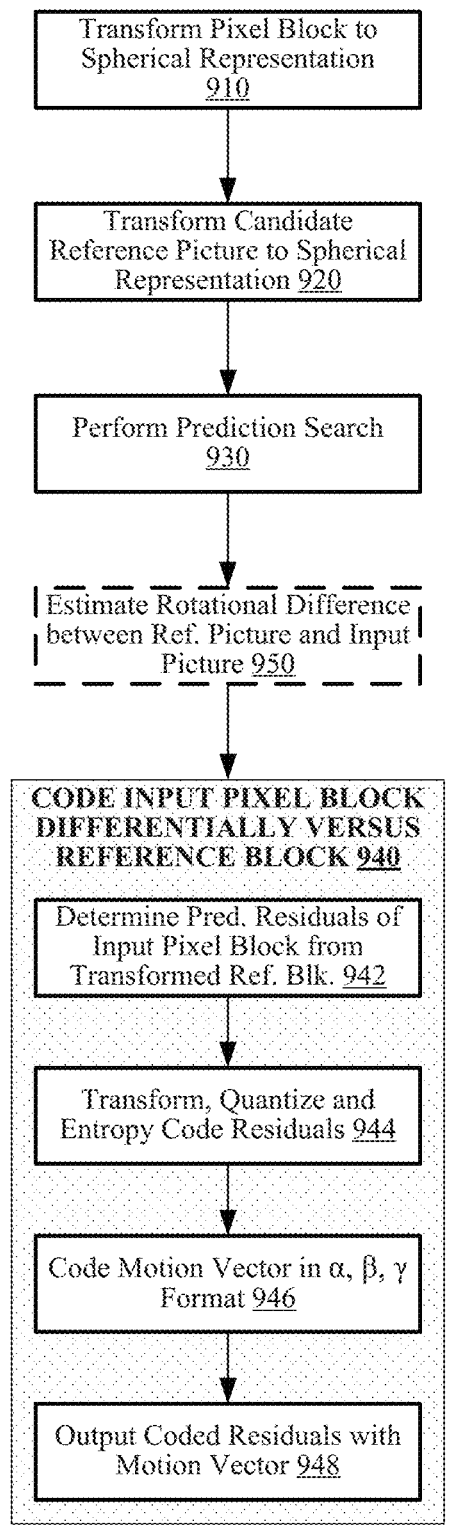
FIG. 9 illustrates a coding method according to an embodiment of the present disclosure.

FIG. 9 illustrates a coding method 900 according to an embodiment of the present disclosure. The method 900 may operate on a pixel block by pixel block basis to code a new input picture that is to be coded. The method 900 may begin by transforming data of an input pixel block to a spherical representation (box 910). The method 900 also may transform candidate reference picture data to the spherical representation (box 920). Thereafter, the method 900 may perform a prediction search (box 930) from a comparison between the transformed pixel block data and transformed reference picture data. When an appropriate prediction reference is found, the method 900 may code the input pixel block differentially using the matching reference block as a basis for prediction (box 940). Typically, this differential coding includes a calculation of pixel residuals from a pixel-wise subtraction of prediction block data from the input pixel block data (box 942) and a transformation, quantization and entropy coding of the pixel residuals obtained therefrom (box 944). The method 900 may represent motion vector data in a $\alpha, \beta, \gamma$ format (box 946) where $\alpha, \beta$, and $\gamma$ respectively represent rotations of the spherically-projected reference picture from its initial axis (FIG. 6). The method 900 may output the motion vector along with the coded residuals and other metadata of prediction (typically, coding mode indicators, reference picture IDs) (box 948).

In another embodiment, the method 900 may represent the $\alpha, \beta, \gamma$ format differentially with respect to a global rotation value estimated for the reference picture. In such an embodiment, the method 900 may estimate a global notational difference between a reference picture and an input picture (box 940). For example, the method 900 may perform overall comparisons between the spherical projection of the input picture 610 (FIG. 6) and the spherical protection of the reference picture 620. The method may generate a first rotational parameter, called a "global rotation," which reflects a detected rotation between the input picture 610 and the reference picture 620. The global rotation may be coded as a first vector $\alpha, \beta, \gamma$. During coding of individual spherically-projected pixel blocks 614, 616, the reference picture may be rotated further in an effort to find rotations that achieve lower coding costs J than would be achieved if reference blocks were selected using the global rotation values alone. If such rotations are identified, then the motion vectors for the pixel blocks 614, 616 may be coded differentially with respect to the global rotation vector $\alpha, \beta, \gamma$ in a format $\Delta\alpha, \Delta\beta$ and $\Delta\gamma$. In an embodiment, the global vector may be included in coded video data in syntactic elements that occur at a higher level than the coded pixel block data, for example, in picture header or slice headers. And, when a single input picture is coded with reference to a plurality of reference pictures, such headers may include fields for identification of the reference pictures (for example, by a picture ID) and the global rotation vectors $\alpha, \beta, \gamma$ that apply to each of them.

The coding method 900 of FIG. 9 may be performed by a video coder such as shown in FIG. 7. In this embodiment, however, when the predictor 770 outputs spherical-domain motion vectors to the controller 780, the controller need not convert the motion vectors to a coder-domain representation. The controller 780 may perform the estimation of rotational differences between the input picture and the reference picture (inputs not shown) and may derive appropriate motion vectors representations as described. The controller 780 also may output its estimate of rotational differences to the channel.

Similarly, decoding may be performed by a video decoder such as shown in FIG. 8. In this embodiment, however, a controller 860 may perform conversion operations to convert motion vectors from their differential representation ($\Delta$MV) to absolute representation (MV) and further to convert the absolute representations of the motion vectors from a spherical-domain representation to a coder domain representation. Thereafter, the predictor 850 may retrieve appropriate reference blocks from the reference picture store 840 and provide them to the pixel block decoder 820.

In another embodiment, spherical projections may assign variable radii to portions of image content from either input pictures or reference pictures. Such variable radii may accommodate object motion or camera movement that causes image content to become resized between input pictures and reference pictures. For example, when an object moves toward or away from a camera, the object's size within the camera's field of view may increase or decrease accordingly. Similarly, when a camera moves, some objects become close to the camera, in which cause their sizes increase, and other objects become farther from the camera, in which case their sizes decrease. In either case, a video coder may compensate for such changes by different radii among spherical projections.

FIG. 10 illustrates an exemplary use case in which an input picture 1010 to be coded is transformed into a spherical projection 1012 on a sphere having radius R. The input picture 1010 may be coded predictively using a reference picture 1020 as a prediction reference, which has its own spherical projection 1022. For convenience, FIG. 10 illustrates only a portion of the spherical projections for the input and reference pictures. In FIG. 10, the spherical projection of the reference picture is shown also having a radius R. In an embodiment, a video coder may vary radii of the spherical projections 1012, 1022 of the input picture and the reference picture according to detected differences in relative sizes among objects therein in an effort to detect correlation between them. When correlation is found, the video coder may derive relative ratios of radii in the spherical projection 1012, 1022, shown as $R_I/R_P$, which reflects resizing between the elements of image content in the two projections 1012, 1022. In this manner, the spherical projection of one of the pictures (here, the reference picture 1020) may be altered, shown as projection 1024, to accommodate the alternate radius $R_P$. Thereafter, the resizing ratio $R_I/R_P$, along with other components of motion vectors derived from the prior embodiments, may be mapped to the reference picture, which identifies a reference block 1026 in the reference picture that may be resized and used as a basis to predict a pixel block 1014 in the input picture 1010.

Variations of radii among spherical projections may be performed anew for each pixel block being coded or at other coding granularities. Thus, a video coder may change the radius of a reference pictures spherical projection on a per picture basis, a per tile basis or a per slice basis, if desired.

In another embodiment, spherical projections may assign variable spatial locations of origins of the spherical projections assigned to image content from the input pictures and/or the reference pictures. Such variable origins may accommodate object motion of camera movement that causes image content to become resized between input pictures and reference pictures. As discussed, when a camera moves, some objects become close to the camera, in which case their sizes increase, and other objects become farther from the camera, in which case their sizes decrease. In this case, a video coder may compensate for such changes by assigning different locations to origins of the spherical projections.

FIG. 11 illustrates an exemplary use case in which an input picture 1110 to be coded is transformed into a spherical projection 1112 on a sphere having a radius R. The input picture 1110 may be coded predictively using a reference picture 1120 as a prediction reference, which has its own spherical projection 1122. For convenience, FIG. 11 illustrates only a portion of the spherical projections for the input and reference pictures. In FIG. 11, the spherical projection of the reference picture is shown also having the radius R. In an embodiment, a video coder may vary locations of origins of the radii R of the spherical projections 1112, 1122 of the input picture and the reference picture according to detected differences in relative sizes among objects therein in an effort to detect correlation between them. When correlation is found, the video coder may derive a relative offset among the spherical projections 1112, 1122, shown as Δx, Δy, Δz, which reflects shifts among the two projections 1112, 1122. Thereafter, the origin offsets Δx, Δy, Δz, along with other components of motion vectors derived from the prior embodiments, may be mapped to the reference picture, which identifies a reference block 1124 in the reference picture that may be resized and used as a basis to predict a pixel block 1114 in the input picture 1110.

Variations of origin offsets Δx, Δy, Δz among spherical projections may be performed anew for each pixel block being coded or at other coding granularities. Thus, a video coder may change the origin offset of reference picture spherical projections on a per picture basis, a per tile basis or a per slice basis, if desired.

In a further embodiment, the techniques of FIG. 9, FIG. 10 and FIG. 11 may be combined to provide video coders and decoders multiple degrees of freedom to identify differences among spherical projections of input pictures and reference pictures. Thus, a video coder may provide motion vectors that reflect, for example, offsets with respect to a global rotation vector (which may be represented by angular vectors α, β, γ), radial ratios $R_I/R_P$ and/or origin offsets Δx, Δy, Δz.

Figure 12:
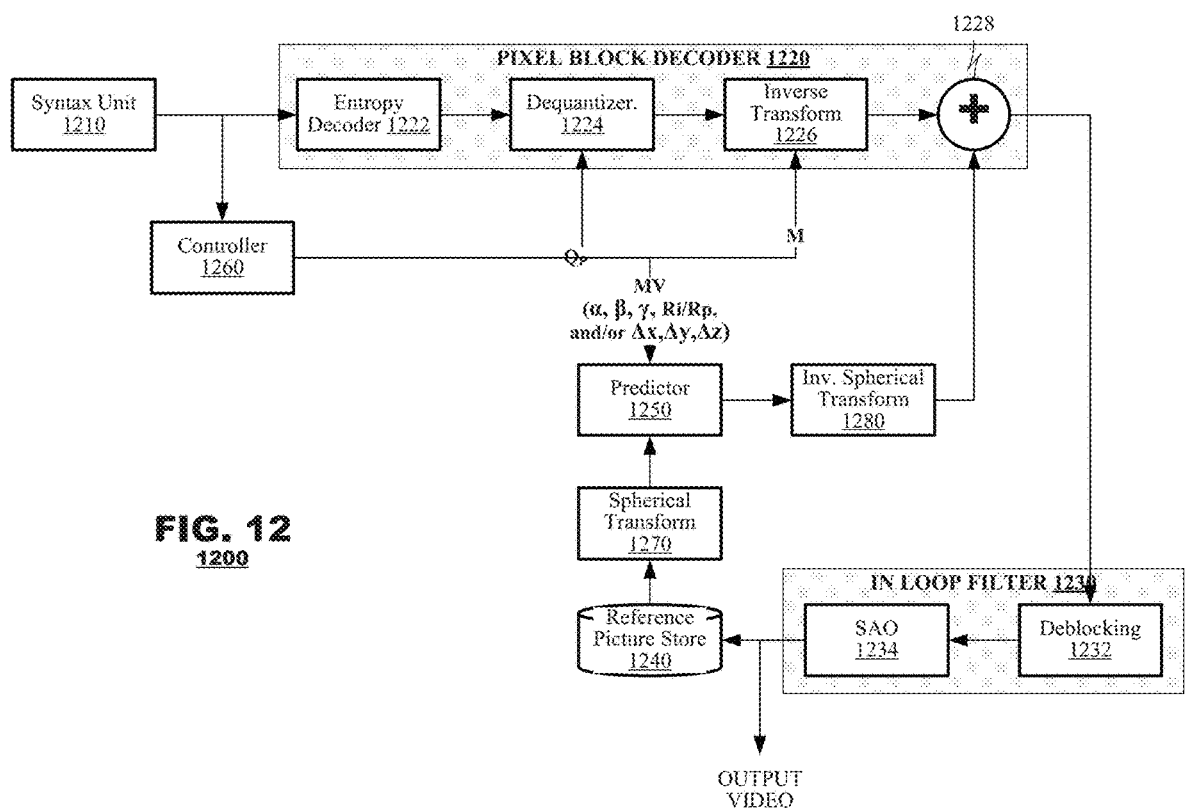
FIG. 12 is a functional block diagram of a decoding system according to another embodiment of the present disclosure.

FIG. 12 is a functional block diagram of a decoding system 1200 according to another embodiment of the present disclosure. In the embodiment of FIG. 12, the decoding system 1200 may operate in a domain of a spherical projection, shown figuratively in FIGS. 3-4, 6 and 10-11, until decoded image data is to be output from the decoding system 1200. Decoded image data may be converted to a two-dimensional domain when it is to be output from the decoding system 1200.

The decoding system 1200 may include a syntax unit 1210, a pixel block decoder 1220, an in-loop filter 1230, a reference picture store 1240, a predictor 1250, a controller 1260, inverse spherical transform unit 1270 and an inverse spherical transform unit 1280. The syntax unit 1210 may receive a coded video data stream and may parse the coded data into its constituent parts. Data representing coding parameters may be furnished to the controller 1260 while data representing coded residuals (the data output by the pixel block coder 210 of FIG. 2) may be furnished to the pixel block decoder 1220. The pixel block decoder 1220 may invert coding operations provided by the pixel block coder (FIG. 2). The in-loop filter 1230 may filter reconstructed pixel block data. The reconstructed pixel block data may be assembled into pictures for display and output from the decoding system 1200 as output video. The pictures also may be stored in the prediction buffer 1240 for use in prediction operations. The predictor 1250 may supply prediction data to the pixel block decoder 1220 as determined by coding data received in the coded video data stream. The spherical transform unit 1270 may transform data from the reference picture store 1240 to the spherical domain and furnish the transformed data to the predictor 1250. The inverse spherical transform unit 1280 may transform prediction data from the spherical domain back to the domain of the pixel block encoder 1220 and may furnish the transformed data to the adder 1228 therein.

The pixel block decoder 1220 may include an entropy decoder 1222, a dequantizer 1224, an inverse transform unit 1226, and an adder 12212. The entropy decoder 1222 may perform entropy decoding to invert processes performed by the entropy coder 7112 (FIG. 12). The dequantizer 1224 may invert operations of the quantizer 716 of the pixel block coder 710 (FIG. 7). Similarly, the inverse transform unit 1226 may invert operations of the transform unit 714 (FIG. 7). They may use the quantization parameters $Q_P$ and transform modes M that are provided in the coded video data stream. Because quantization is likely to truncate data, the data recovered by the dequantizer 1224, likely will possess coding errors when compared to the input data presented to its counterpart quantizer 716 in the pixel block coder 210 (FIG. 2).

The adder 1228 may invert operations performed by the subtractor 712 (FIG. 7). It may receive a prediction pixel block from the predictor 1250 as determined by prediction references in the coded video data stream. The adder 1228 may add the prediction pixel block to reconstructed residual values output by the inverse transform unit 1226 and may output reconstructed pixel block data.

The in-loop filter 1230 may perform various filtering operations on reconstructed pixel block data. As illustrated, the in-loop filter 1230 may include a deblocking filter 1232 and an SAO filter 1234. The deblocking filter 1232 may filter data at seams between reconstructed pixel blocks to reduce discontinuities between the pixel blocks that arise due to coding. SAO filters 1234 may add offset to pixel values according to an SAO type, for example, based on edge direction/shape and/or pixel level. Other types of in-loop filters may also be used in a similar manner. Operation of the deblocking filter 1232 and the SAO filter 1234 ideally would mimic operation of their counterparts in the coding system 700 (FIG. 7). Thus, in the absence of transmission errors or other abnormalities, the decoded picture obtained from the in-loop filter 1230 of the decoding system 1200 would be the same as the decoded picture obtained from the in-loop filter 730 of the coding system 700 (FIG. 7); in this manner, the coding system 700 and the decoding system 1200 should store a common set of reference pictures in their respective reference picture stores 740, 1240.

The reference picture stores 1240 may store filtered pixel data for use in later prediction of other pixel blocks. The reference picture stores 1240 may store decoded pixel block data of each picture as it is coded for use in intra prediction. The reference picture stores 1240 also may store decoded reference pictures.

As discussed, the predictor 1250 may supply prediction data to the pixel block decoder 1220. The predictor 1250 may supply predicted pixel block data as determined by the prediction reference indicators supplied in the coded video data stream.

The controller 1260 may control overall operation of the coding system 1200. The controller 1260 may set operational parameters for the pixel block decoder 1220 and the predictor 1250 based on parameters received in the coded video data stream. As is relevant to the present discussion, these operational parameters may include quantization parameters $Q_P$ for the dequantizer 1224 and transform modes M for the inverse transform unit 1215. As discussed, the received parameters may be set at various granularities of image data, for example, on a per pixel block basis, a per picture basis, a per slice basis, a per LCU basis, or based on other types of regions defined for the input image.

In the embodiment of FIG. 12, the pixel block decoder 1220, the in loop filter 1230, the and reference picture store 1240 may operate on image data in a two dimensional domain. The predictor 1250, however, may operate on motion vectors that identify reference blocks according to the techniques described hereinabove with respect to FIGS. 6, 10 and/or 11, which may identify reference pixel blocks by a rotational vector (α, β, γ), a ratio of projection radii (Ri/Rp), and/or offsets between origins of the spherical projections (Δx, Δy, Δz). In response, the predictor 1250 may retrieve a reference picture from the reference picture store 1240 and the spherical transform 1270 may transform the retrieved picture to the spherical domain. The predictor 1250 may align the spherical projection of the reference picture to the input pixel blocks according to the motion vectors that are received (e.g., by rotating the spherical projection of the reference picture according to the rotational vector (α, β, γ), by resizing the spherical projection of the reference picture according to the ratio of projection radii (Ri/Rp), and/or by shifting an origin of the spherical projection of the reference picture according to the origin offsets (Δx, Δy, Δz)). After such processing, a portion of the reference picture that aligns with a location of the coded pixel block that is being decoded may be output to the adder 1228 as a reference block.

The inverse spherical transform unit 1280 may transform the data of the reference block to the two-dimensional domain. The inverse transform unit may invert operations described with respect to ¶¶[29]-[36] hereinabove. The transformed reference block may be output to the adder 1228 of the pixel block decoder 1220 as a prediction block.

Figure 13:
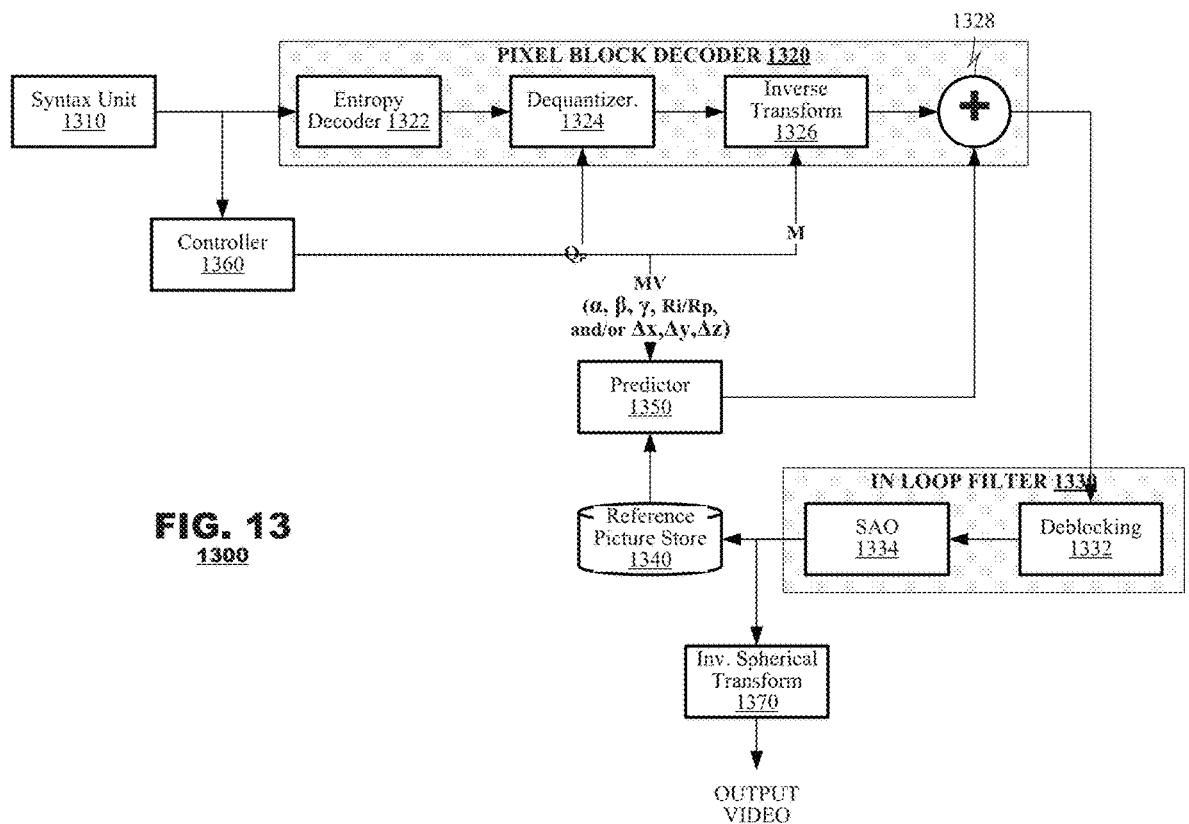
FIG. 13 is a functional block diagram of a decoding system according to a further embodiment of the present disclosure.

FIG. 13 is a functional block diagram of a decoding system 1300 according to another embodiment of the present disclosure. In the embodiment of FIG. 13, the decoding system 1300 may operate in a domain of a spherical projection, shown figuratively in FIGS. 3-4, 6 and 10-11, until decoded image data is to be output from the decoding system 1300. Decoded image data may be converted to a two-dimensional domain when it is to be output from the decoding system 1300.

The decoding system 1300 may include a syntax unit 1310, a pixel block decoder 1320, an in-loop filter 1330, a reference picture store 1340, a predictor 1350, a controller 1360 and a inverse spherical transform unit 1370. The syntax unit 1310 may receive a coded video data stream and may parse the coded data into its constituent parts. Data representing coding parameters may be furnished to the controller 1360 while data representing coded residuals (the data output by the pixel block coder 210 of FIG. 2) may be furnished to the pixel block decoder 1320. The pixel block decoder 1320 may invert coding operations provided by the pixel block coder (FIG. 2). The in-loop filter 1330 may filter reconstructed pixel block data. The reconstructed pixel block data may be assembled into pictures for display and output from the decoding system 1300 as output video. The pictures also may be stored in the prediction buffer 1340 for use in prediction operations. The predictor 1350 may supply prediction data to the pixel block decoder 1320 as determined by coding data received in the coded video data stream.

The pixel block decoder 1320 may include an entropy decoder 1322, a dequantizer 1324, an inverse transform unit 1326, and an adder 13213. The entropy decoder 1322 may perform entropy decoding to invert processes performed by the entropy coder 7113 (FIG. 13). The dequantizer 1324 may invert operations of the quantizer 716 of the pixel block coder 710 (FIG. 7). Similarly, the inverse transform unit 1326 may invert operations of the transform unit 714 (FIG. 7). They may use the quantization parameters $Q_P$ and transform modes M that are provided in the coded video data stream. Because quantization is likely to truncate data, the data recovered by the dequantizer 1324, likely will possess coding errors when compared to the input data presented to its counterpart quantizer 716 in the pixel block codex 210 (FIG. 2).

The adder 1328 may invert operations performed by the subtractor 713 (FIG. 7). It may receive a prediction pixel block from the predictor 1350 as determined by prediction references in the coded video data stream. The adder 1328 may add the prediction pixel block to reconstructed residual values output by the inverse transform unit 1326 and may output reconstructed pixel block data.

The in-loop filter 1330 may perform various tittering operations on reconstructed pixel block data. As illustrated, the in-loop filter 1330 may include a deblocking filter 1332 and an SAO filter 1334. The deblocking filter 1332 may filter data at seams between reconstructed pixel blocks to reduce discontinuities between the pixel blocks that arise due to coding. SAO filters 1334 may add offset to pixel values according to an SAO type, for example, based on edge direction/shape and/or pixel level. Other types of in-loop filters may also be used in a similar manner. Operation of the deblocking filter 1332 and the SAO filter 1334 ideally would mimic operation of their counterparts in the coding system 700 (FIG. 7). Thus, in the absence of transmission errors or other abnormalities, the decoded picture obtained from the in-loop filter 1330 of the decoding system 1300 would be the same as the decoded picture obtained from the in-loop filter 730 of the coding system 700 (FIG. 7); in this manner, the coding system 700 and the decoding system 1300 should store a common set of reference pictures in their respective reference picture stores 740, 1340.

The reference picture stores 1340 may store filtered pixel data for use in later prediction of other pixel blocks. The reference picture stores 1340 may store decoded pixel block data of each picture as it is coded for use in intra prediction. The reference picture stores 1340 also may store decoded reference pictures.

As discussed, the predictor 1350 may supply prediction data to the pixel block decoder 1320. The predictor 1350 may supply predicted pixel block data as determined by the prediction reference indicators supplied in the coded video data stream.

The controller 1360 may control overall operation of the coding system 1300. The controller 1360 may set operational parameters for the pixel block decoder 1320 and the predictor 1350 based on parameters received in the coded video data stream. As is relevant to the present discussion, these operational parameters may include quantization parameters $Q_P$ for the dequantizer 1324 and transform modes M for the inverse transform unit 1315. As discussed, the received parameters may be set at various granularities of image data, for example, on a per pixel block basis, a per picture basis, a per slice basis, a per LCU basis, or based on other types of regions defined for the input image.

As indicated, the pixel block decoder 1320, the in loop filter 1330, the reference picture store 1340, the predictor 1350 and the controller 1360 may operate on image data in a spherical projection domain. Thus, decoding system 1300 may decode coded pixel blocks that vary in size and shape as shown in FIG. 6. The predictor 1350 may operate on motion vectors that identify reference blocks according to the techniques described hereinabove with respect to FIGS. 6, 10 and/or 11, which may identify reference pixel blocks by a rotational vector (α, β, γ), a ratio of projection radii (Ri/Rp, and/or offsets between origins of the spherical projections (Δx, Δy, Δz). In response, the predictor 1350 may retrieve reference pixel blocks from the reference picture store and align them to the input pixel blocks according to the motion vectors that are received (e.g., by rotating the spherical projection of the reference picture according to the rotational vector (α, β, γ), by resizing the spherical projection of the reference picture according to the ratio of projection radii (Ri/Rp), and/or by shifting an origin of the spherical projection of the reference picture according to the origin offsets (Δx, Δy, Δz)). After such processing, a portion of the reference picture that aligns with a location of the coded pixel block that is being decoded may be output to the adder 1328 as a reference block.

The inverse spherical transform unit 1370 may transform reconstructed images that are output from the in loop filter 1330 to an output domain. Typically, the output domain will be a two-dimensional domain, which causes the reconstructed images to be suitable for display on a display device or for use by an application program that consumes such data. The inverse transform unit may invert operations described with respect to ¶¶[29]-[36] hereinabove. In an embodiment, the inverse spherical transform 1370 may be omitted when outputting reconstructed images to an application that processes graphics data in a spherical domain.

The foregoing embodiments have described video coding and decoding processes that operate on 360° video obtained from camera systems but the principles of the present disclosure are not so limited. The techniques described herein may find application with 360° video regardless of the techniques by which such videos are generated. For example, 360° video may find application in computer applications such as video games and three dimensional rendering applications. Thus, the 360° video may represent computer-generated models of virtual worlds or computer rendered video data representing human-authored content, as desired. The principles of the present disclosure also find application with augmented reality systems in which camera-generated image data and computer-generated graphics data are merged into 360° video pictures that are coded. In this regard, the source of the 360° video is immaterial to the present discussion.

In an embodiment, a video coder and decoder may exchange signaling to identify parameters of the spherical projection. Such signaling may occur according to the following syntax, in one such embodiment.

Video coders and decoder may exchange a projection_format field, which identifies a type of projection format that is used by the video coder in the coder's domain. For example, the projection_format field may contain a projection_format_id value that may take the following values:

TABLE 1

| projection_format_id | Coder Domain Format |
| --- | --- |
| 0 | 2D conventional video |
| 1 | Equirectangular |
| 2 | Cube map |
| 3 | reserved |

The projection_format field may be provided, for example, in a sequence parameter set of a coding protocol such as H.265.

The video coder and decoder may exchange other signaling, such as a use_rotation_estimation field and a rotation_estimation_mode field. The use_rotation_estimate may indicate, for example, whether rotational estimations such as described for box 840 (FIG. 8) are performed. The rotation_estimation_mode field may identify parameters of the rotational estimation, such as by:

TABLE 2

| rotation_estimation_mode | Rotation Angle Signaled Along which Coordinate |
| --- | --- |
| 0 | x, y, z |
| 1 | x, y |
| 2 | x, z |
| 3 | y, z |
| 4 | x |
| 5 | y |
| 6 | X |

The use_rotation_estimation field and the rotation_estimation_mode field may be signaled at different levels of coding granularity within a coding protocol. For example, the use_rotation_estimation field may be signaled at the pixel block level during coding while the rotation_estimation_mode field may be signaled at higher levels of granularity, for example in a sequence parameter set or a picture parameter set. The converse also may occur; the use_rotation_estimation field may be signaled at the sequence parameter set level during coding while the rotation_estimation_mode field may be signaled at a lower level of granularity, for example, at the pixel block level. Moreover, the use_rotation_estimation field and the rotation_estimation_mode field may be predictively coded from picture to picture or from pixel block to pixel block as desired. Additionally, context-adaptive binary arithmetic coding (CABAC) of the parameter data may be performed.

Similarly, the video coder and decoder may exchange other signaling, such as a global_rotation_estimation_mode field, that may signal a type of global rotation estimation that is performed. The global_rotation_estimation_mode field may identify parameters of the global rotational estimation, such as by:

| global_rotation_estimation_mode | Mode |
| --- | --- |
| 0 | No global rotation estimation |
| 1 | Rotate reference |
| 2 | Rotate Source |

The global_rotation_estimation_mode field may be signaled in a sequence parameter set, a picture parameter set, or a slice segment header as may be convenient.

The foregoing discussion has described operation of the embodiments of the present disclosure in the context of video coders and decoders. Commonly, these components are provided as electronic devices. Video decoders and/or controllers can be embodied in integrated circuits, such as application specific integrated circuits, field programmable gate arrays and/or digital signal processors. Alternatively, they can be embodied in computer programs that execute on camera devices, personal computers, notebook computers, tablet computers, smartphones or computer servers. Such computer programs typically are stored in physical storage media such as electronic-, magnetic- and/or optically-based storage devices, where they are read to a processor and executed. Decoders commonly are packaged in consumer electronics devices, such as smartphones, tablet computers, gaming systems, DVD players, portable media players and the like; and they also can be packaged in consumer software applications such as video games, media players, media editors, and the like. And, of course, these components may be provided as hybrid systems that distribute functionality across dedicated hardware components and programmed general-purpose processors, as desired.

The foregoing description has been presented for purposes of illustration and description. It is not exhaustive and does not limit embodiments of the disclosure to the precise forms disclosed. Modifications and variations are possible in light of the above teachings or may be acquired from the practicing embodiments consistent with the disclosure. Unless described otherwise herein, any of the methods may be practiced in any combination.

We claim:

1. A video coding method, comprising:
   for a plurality of input pixel blocks from an input picture in a source-domain representation:
      transforming a first input pixel block in the source-domain representation to a spherical-domain representation;
      transforming a candidate reference picture from the source-domain representation to the spherical representation;
      searching for a match between the spherical-domain representation of the first input pixel block and a portion of the spherical-domain representation of the candidate reference picture;
      on a match, determining a spherical-domain motion vector including a spherical-domain rotational offset for predicting the first input pixel block in the spherical-domain representation from a matching portion of a reference picture in the spherical-domain representation;
      transforming the spherical-domain motion vector to a two-dimensional source-domain motion vector and a source-domain rotational offset for predicting the first input pixel block in the source-domain representation of the input picture; and
      predictively coding the first input pixel block in the source-domain including determining a source-domain prediction from the reference picture in the source-domain based on the two-dimensional source-domain motion vector and the source domain rotational offset.

2. The method of claim 1, wherein the searching comprise searching for a best mode to optimize overall cost to send source-domain representation of the pixel block in terms of minimum spherical domain error and source-domain bit rate.

3. The method of claim 1, further comprising, outputting coded data of the pixel blocks with source-domain motion vectors as coded data of the input picture.

4. The method of claim 1, further comprising, outputting, with coded data of the pixel blocks, spherical-domain offsets as coded data of the input picture.

5. The method of claim 4, further comprising, on the match:
   outputting data identifying the rotational offset, wherein the outputted spherical-domain offsets are represented differentially with respect to the rotational offset.

6. The method of claim 1, wherein, for at least one pixel block, the searching includes estimating a relative radius ratio between the spherical-domain representation of the pixel block and the spherical-domain representation of the matching portion of the reference picture, and outputting data identifying the relative radius ratio as coded data of the respective input pixel block.

7. The method of claim 1, wherein, for at least one pixel block, the searching includes estimating a relative offset between an origin of the spherical-domain representation of the pixel block and an origin of the spherical-domain representation of the matching portion of the of the reference picture, and outputting data identifying the relative offset as coded data of the respective input pixel block.

8. The method of claim 1, wherein the searching comprises
   estimating, for a plurality of candidate blocks from the reference pictures, a number of bits required to code the input pixel block with reference to each respective candidate block, and
   a matching candidate block is selected based on a relative differences between the number of bits estimated as required from among the candidate blocks.

9. The method of claim 1, wherein the searching comprises
   estimating, for a plurality of candidate blocks from the reference pictures, an amount of distortion that could be created by coding the input pixel block with reference to each respective candidate block, and
   a matching candidate block is selected based on a relative differences between the amount of distortion estimated for each of the candidate blocks.

10. The method of claim 1, wherein the input picture is an equirectangular picture in its source-domain representation.

11. The method of claim 1, wherein the input picture is a cube map picture in its source-domain representation.

12. The method of claim 1, wherein the input picture is one of a truncated pyramid-based, tetrahedral-based, octahedral-based, dodecahedral-based and icosahedral-based image in its source-domain representation.

13. A video coder, comprising:
   a pixel block coder, having an input for a pixel block of input data in a coding-domain and a reference pixel block,
   a reference picture store, storing data of a plurality of reference pictures in the coding-domain,
   a pair of spherical transform units, a first spherical transform unit having an input for the input pixel block in the coding-domain and a second spherical transform unit having an input for reference picture data in the coding-domain,
   a predictor having spherical-domain inputs coupled to outputs from the first and second spherical transform units,
   wherein, the predictor selects a spherical-domain motion vector including a spherical-domain rotational offset by searching the spherical transformed reference pictures for a prediction reference of the spherical transformed input pixel block, the predictor converts the spherical-domain motion vector to a coding-domain motion vector and a coding-domain rotational offset and outputs a prediction block in the coding-domain to the pixel block coder, and the pixel block coder codes a coding-domain residual between the pixel block in the coding-domain and the prediction in the coding domain.

14. The video coder of claim 13, wherein the video coder outputs coded data of the pixel blocks with source-domain motion vectors as coded data of the input picture.

15. The video coder of claim 13, wherein the video coder outputs coded data of the pixel blocks with spherical-domain offsets as coded data of the input picture.

16. The video coder claim 15, further comprising a controller that:
outputs data identifying the rotational offset, wherein the outputted spherical-domain offsets are represented differentially with respect to the rotational offset.

17. The video coder of claim 13, further comprising a controller that estimates a relative radius ratio between the spherical-domain representation of the pixel block and the spherical-domain representation of the matching portion of the of the reference picture, and outputting data identifying the relative radius ratio as coded data of the respective input pixel block.

18. The video coder of claim 13, further comprising a controller that estimates a relative offset between an origin of the spherical-domain representation of the pixel block and an origin of the spherical-domain representation of the matching portion of the of the reference picture, and outputting data identifying the relative offset as coded data of the respective input pixel block.

19. The video coder of claim 13, wherein the predictor:
estimates, for a plurality of candidate blocks from the reference pictures, a number of bits required to code the input pixel block with reference to each respective candidate block, and
selects a matching candidate block based on a relative differences between the number of bits estimated as required from among the candidate blocks.

20. The video coder of claim 13, wherein the predictor:
estimates, for a plurality of candidate blocks from the reference pictures, an amount of distortion that could be created by coding the input pixel block with reference to each respective candidate block, and
selects a matching candidate block based on a relative differences between the amount of distortion estimated for each of the candidate blocks.

21. The video coder of claim 13, wherein the input picture is an equirectangular picture in its source-domain representation.

22. The video coder of claim 13, wherein the input picture is a cube map picture in its source-domain representation.

23. A non-transitory computer readable medium storing program instructions that, when executed by a processing device, cause the device to:
for a plurality of input pixel blocks from an input picture in a source-domain representation:
transforming an first input pixel block in the source-domain representation to a spherical-domain representation;
transforming a candidate reference picture from the source-domain representation to the spherical representation;
searching for a match between the spherical-domain representation of the first input pixel block and a portion of the spherical-domain representation of the candidate reference picture;
on a match, determining a spherical-domain motion vector including a spherical-domain rotational offset for predicting the first input pixel block in the spherical-domain representation from a matching portion of a reference picture in the spherical-domain representation;
transforming the spherical-domain motion vector to a two-dimensional source-domain motion vector and a source-domain rotational offset for predicting the first input pixel block in the source-domain representation of the input picture; and
predictively coding the first input pixel block in the source-domain including determining a source-domain prediction from the reference picture in the source-domain based on the two-dimensional source-domain motion vector and the source domain rotational offset.

24. The medium of claim 23, further comprising, on the match:
determining a rotational offset between a spherical-domain representation of the input picture and a spherical-domain representation of the reference picture,
outputting data identifying the rotational offset, and
outputting coded data of the pixel blocks with spherical-domain offsets as coded data of the input picture, wherein the spherical-domain offsets are represented differentially with respect to the rotational offset.

25. The medium of claim 23, wherein, for at least one pixel block, the searching includes estimating a relative radius ratio between the spherical-domain representation of the pixel block and the spherical-domain representation of the matching portion of the of the reference picture, and outputting data identifying the relative radius ratio as coded data of the respective input pixel block.

26. The medium of claim 23, wherein, for at least one pixel block, the searching includes estimating a relative offset between an origin of the spherical-domain representation of the pixel block and an origin of the spherical-domain representation of the matching portion of the of the reference picture, and outputting data identifying the relative offset as coded data of the respective input pixel block.

27. A video decoder, comprising:
a pixel block decoder having an input for coded image data and an output for reconstructed pixel blocks in a non-spherical projection domain;
a reference picture store for storing reconstructed reference pictures assembled from reconstructed pixel blocks of frames in the non-spherical projection domain represented by the coded video data; and
a predictor, responsive to motion vector data in a spherical-domain included in the coded image data, for converting the motion vector data in the spherical-domain to motion vector data in the non-spherical projection domain and providing reference block data in the non-spherical projection domain to the pixel block decoder based upon manipulations of a reference picture in a spherical domain;
wherein the motion vector data includes an identification of a rotational offset between a spherical domain representation of the coded picture and a spherical domain representation of a reference picture, and the predictor aligns the reference picture and the coded picture according to the rotational offset.

28. The video decoder of claim 27, further comprising a transform unit for transforming reconstructed pictures from the spherical domain representation to a two-dimensional domain representation.

29. The video decoder of claim 27, wherein motion vector data of a coded picture includes an identification of a ratio of radii between a spherical domain representation of the coded picture and a spherical domain representation of a reference picture identified by the motion vector, and the predictor aligns the spherical domain representation of the reference picture to the spherical domain representation of the coded picture according to the ratio.

30. The video decoder of claim 27, wherein the motion vector includes an identification of an offset between an origin of a spherical domain representation of the coded picture and an origin of a spherical domain representation of a reference picture identified by the motion vector, and the predictor aligns the origins of the reference picture and the coded picture according to the offset.

31. A video coding method, comprising:
for an input pixel block from an input picture in a source-domain representation:
　transforming the input pixel block in the source-domain representation to a spherical-domain representation;
　transforming a candidate reference picture from the source-domain representation to the spherical representation;
　searching for a match between the spherical-domain representation of the input pixel block and a portion of the spherical-domain representation of the candidate reference picture;
　on a match, determining a spherical-domain motion vector between the pixel block in the spherical-domain representation and a matching portion of a reference picture in the spherical-domain representation;
　transforming the spherical-domain motion vector to a source-domain motion vector for predicting the input pixel block in the source-domain representation of the input picture,
　predictively coding the input pixel block with reference to a source-domain representation of the matching portion of the reference picture converted from the spherical-domain representation; and
　outputting the coded pixel block and the spherical-domain offset.

32. A video coding method, comprising:
for a plurality of input pixel blocks from an input picture in a source-domain representation:
　transforming a first input pixel block in the source-domain representation to a spherical-domain representation;
　transforming a candidate reference picture from the source-domain representation to the spherical representation;
　searching for a match between the spherical-domain representation of the first input pixel block and a portion of the spherical-domain representation of the candidate reference picture;
　on a match, determining spherical-domain offsets including a rotational offset for predicting the first input pixel block in the spherical-domain representation from a matching portion of a reference picture in the spherical-domain representation; and
　predictively coding the first input pixel block including predicting the first input pixel block in the spherical-domain using the spherical domain offsets including the rotational offset, and including in the coded output indications of the spherical domain offsets with the rotational offset.

\* \* \* \* \*